(12) United States Patent
Takeuchi et al.

(10) Patent No.: US 8,338,999 B2
(45) Date of Patent: Dec. 25, 2012

(54) BRUSHLESS MOTOR

(75) Inventors: Kesatoshi Takeuchi, Shiojiri (JP);
Kazuyoshi Nakamura, Azumino (JP);
Mamoru Sugimoto, Chino (JP)

(73) Assignee: Seiko Epson Corporation (JP)

( * ) Notice: Subject to any disclaimer, the term of this patent is extended or adjusted under 35 U.S.C. 154(b) by 226 days.

(21) Appl. No.: 12/174,165

(22) Filed: Jul. 16, 2008

(65) Prior Publication Data
US 2009/0033166 A1 Feb. 5, 2009

(30) Foreign Application Priority Data

Jul. 31, 2007 (JP) ................ 2007-198840
Dec. 18, 2007 (JP) ................ 2007-326027

(51) Int. Cl.
*H02K 7/00* (2006.01)
(52) U.S. Cl. .................... 310/68 R; 310/67 R
(58) Field of Classification Search ............ 310/68 R, 310/67 R
See application file for complete search history.

(56) References Cited

U.S. PATENT DOCUMENTS

| | | | | | |
|---|---|---|---|---|---|
| 1,566,693 | A | * | 12/1925 | Pletscher | 310/152 |
| 4,187,441 | A | * | 2/1980 | Oney | 310/112 |
| 4,853,567 | A | * | 8/1989 | Muramatsu et al. | 310/67 R |
| 5,061,868 | A | * | 10/1991 | Iwazaki et al. | 310/67 R |
| 5,258,676 | A | * | 11/1993 | Reinhardt et al. | 310/112 |
| 5,267,842 | A | * | 12/1993 | Harmsen et al. | 417/354 |
| 5,281,886 | A | * | 1/1994 | Ohta | 310/90 |
| 5,438,228 | A | * | 8/1995 | Couture et al. | 310/67 R |
| 5,705,866 | A | * | 1/1998 | Oguchi | 310/67 R |
| 5,945,751 | A | * | 8/1999 | Hans et al. | 310/67 R |
| 5,949,165 | A | * | 9/1999 | Sakuragi | 310/67 R |
| 5,982,070 | A | * | 11/1999 | Caamano | 310/216.047 |
| 6,049,149 | A | * | 4/2000 | Lin et al. | 310/68 R |
| 6,163,097 | A | * | 12/2000 | Smith et al. | 310/261.1 |
| 6,278,207 | B1 | * | 8/2001 | Matsumoto | 310/88 |
| 6,445,105 | B1 | * | 9/2002 | Kliman et al. | 310/268 |
| 6,565,334 | B1 | * | 5/2003 | Bradbury et al. | 417/423.1 |
| 6,617,734 | B2 | * | 9/2003 | Taniguchi et al. | 310/90.5 |
| 6,691,000 | B2 | | 2/2004 | Nagai et al. | |
| 6,794,777 | B1 | * | 9/2004 | Fradella | 310/74 |
| 6,982,530 | B2 | * | 1/2006 | Takeuchi | 318/34 |
| 2001/0054854 | A1 | * | 12/2001 | Akahori | 310/90 |
| 2002/0047344 | A1 | * | 4/2002 | Herndon et al. | 310/67 R |
| 2004/0239209 | A1 | * | 12/2004 | Lefley | 310/269 |
| 2005/0194862 | A1 | * | 9/2005 | Qu et al. | 310/268 |
| 2005/0200213 | A1 | * | 9/2005 | Takeuchi | 310/68 B |
| 2005/0275359 | A1 | * | 12/2005 | Takeuchi et al. | 318/138 |
| 2006/0279166 | A1 | * | 12/2006 | Takeuchi | 310/268 |
| 2008/0054859 | A1 | * | 3/2008 | Takeuchi | 322/36 |

FOREIGN PATENT DOCUMENTS

| | | |
|---|---|---|
| CN | 11 60943 | 10/1997 |
| CN | 2556843 | 6/2003 |
| JP | 01-174253 | 7/1989 |

(Continued)

*Primary Examiner* — Quyen Leung
*Assistant Examiner* — Alex W Mok
(74) *Attorney, Agent, or Firm* — Harness, Dickey & Pierce, P.L.C.

(57) ABSTRACT

The brushless motor includes a stator having a electromagnetic coil and a position sensor; an axis fixed to the stator; and a rotor having a permanent magnet. The rotor rotates around the axis. The rotor is linked to a driven member that is driven by the brushless motor.

7 Claims, 21 Drawing Sheets

FOREIGN PATENT DOCUMENTS

| | | |
|---|---|---|
| JP | 08-182282 | 7/1996 |
| JP | 2657796 | 6/1997 |
| JP | 2001-298982 | 10/2001 |
| JP | 2003-136450 | 5/2003 |
| JP | 2006-311688 | 11/2006 |
| JP | 2007-185094 | 7/2007 |

* cited by examiner

Back electromotive force Ec

Sensor output SSA

Sensor output SSB

Forward rotation
Immediately before phase = 0

Immediately before phase = $\pi/2$

Immediately before phase = $\pi$

Immediately before phase = $3\pi/2$

Reverse rotation

Immediately before
phase = 0

Immediately before
phase = $\pi/2$

Immediately before
phase = $\pi$

Immediately before
phase = $3\pi/2$

Fig.7
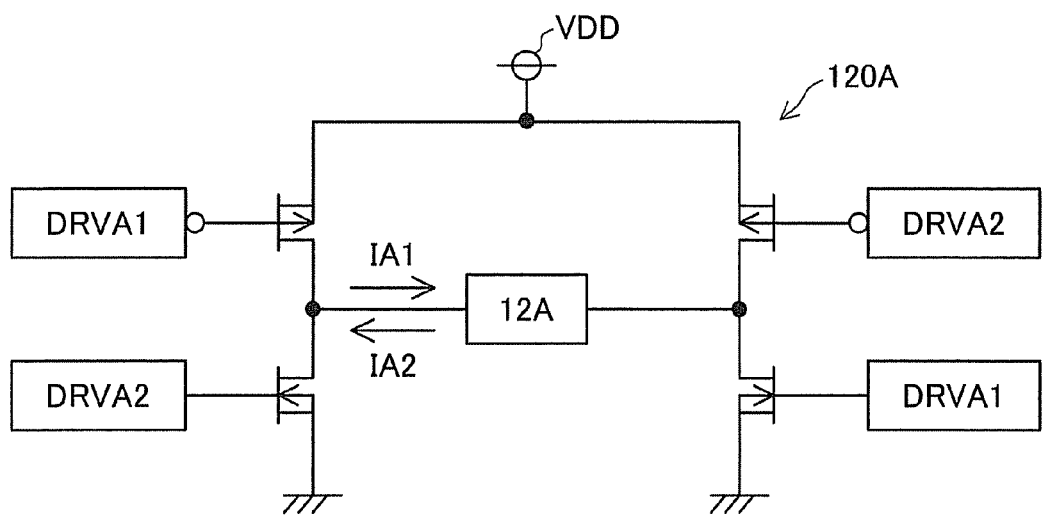
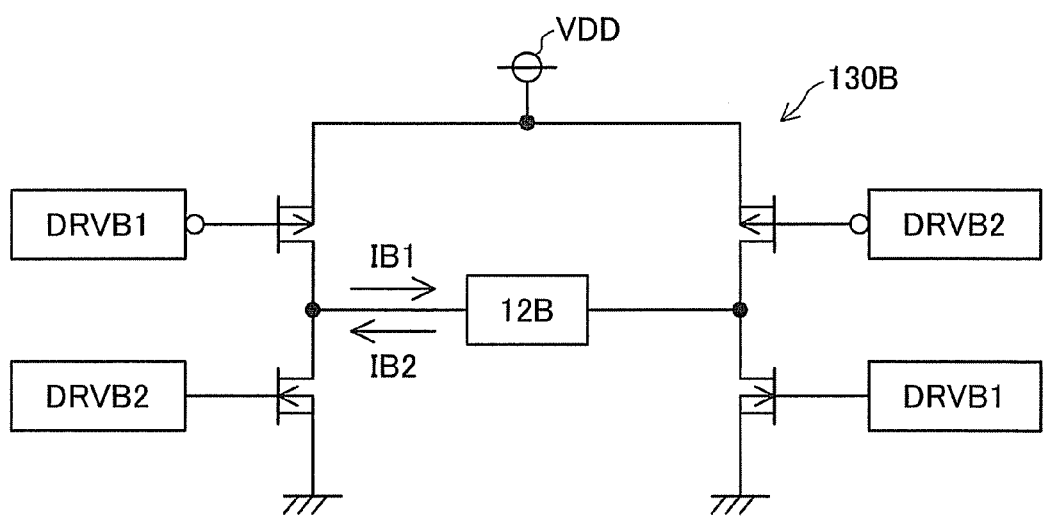

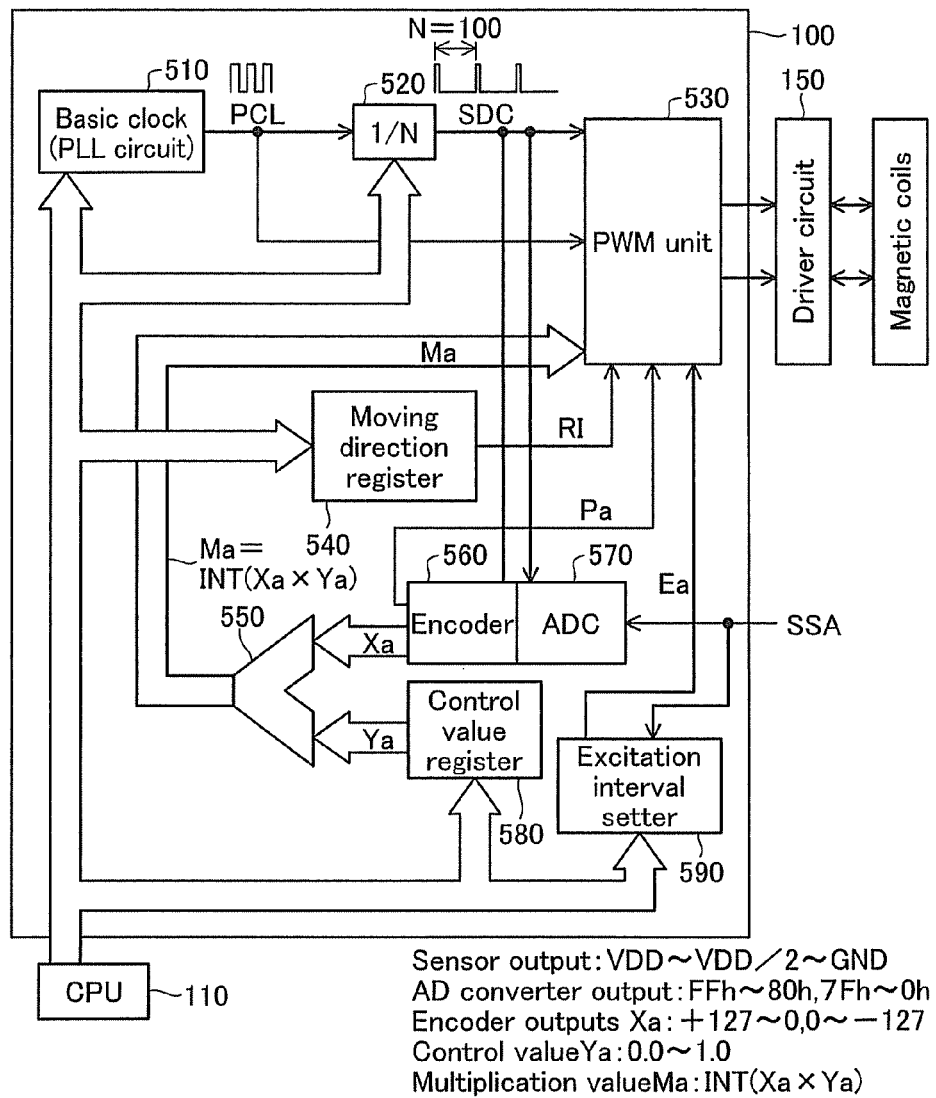

SSA

DRVA1+DRVA2
HiZ

DRVA1+DRVA2

Driving by rectangular wave

Current attenuates in association with increased speed

Driving by sine wave

Current attenuates in association with increased speed

Fig.15
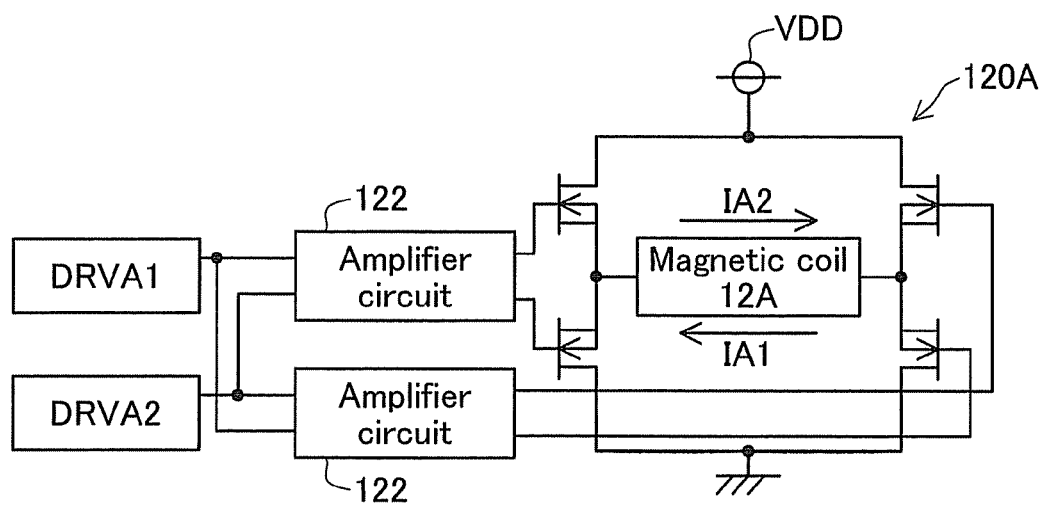
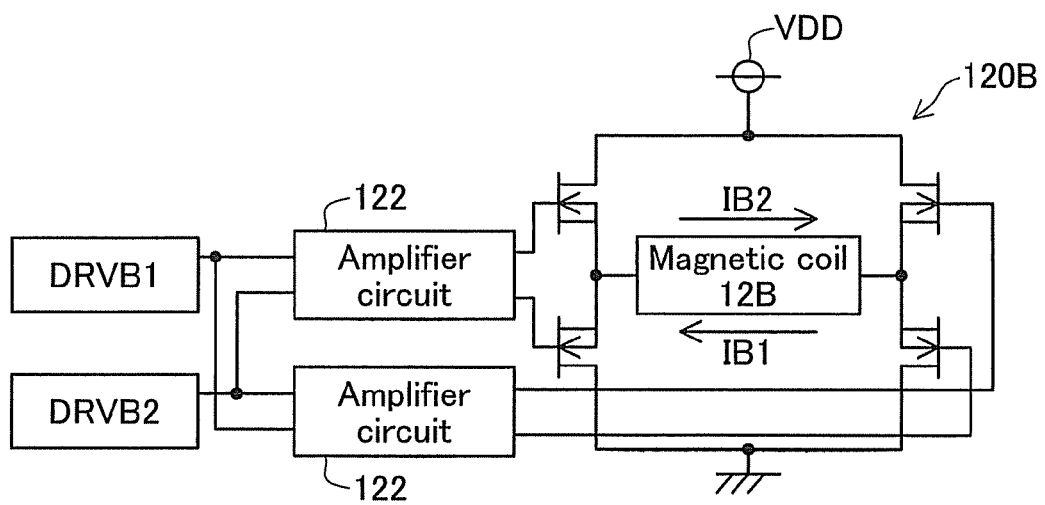

BRUSHLESS MOTOR

CROSS-REFERENCE TO RELATED APPLICATIONS

The present application claims the priority based on Japanese Patent Applications No. 2007-198840 filed on Jul. 31, 2007 and No. 2007-326027 filed on Dec. 18, 2007, the disclosures of which are hereby incorporated by reference in their entireties.

BACKGROUND OF THE INVENTION

1. Field of the Invention

The present invention relates to a brushless motor that utilizes permanent magnets and electromagnetic coils.

2. Description of the Related Art

The brushless motor disclosed in JP 2001-298982A is one known examples of a brushless motor that utilizes permanent magnets and electromagnetic coils.

In conventional electric motors, a rotor rotates within a stator, and the rotational motion of the rotor is conveyed to a rotation axis connected to the rotor. The rotational motion of the rotation axis is conveyed to a driven member such as a wheel with a transmission mechanism such as gears, or with a direct drive mechanism. However, in this construction, due to the occurrence of torsion at the rotation axis, there is the problem that a delay occurred when the rotational motion of the rotor is transmitted to the driven member such as the wheel, or the problem that large torsional strength is necessary for the rotation axis to transmit a large torque. This problem is not limited to motors but is common to generators.

SUMMARY OF THE INVENTION

An object of the present invention is to provide technology that is able to rotate the driven member without rotating the central axis of the motor.

In an aspect of the present invention, there is provided a brushless motor comprising: a stator having a electromagnetic coil and a position sensor; an axis fixed to the stator; and a rotor having a permanent magnet, the rotor rotating around the axis; wherein the rotor is linked to a driven member that is driven by the brushless motor.

According to this configuration, the axis is fixed to the stator, the rotor rotates around the axis, and the driven member is linked to the rotor, so it is possible to rotate the driven member without rotating the axis of the motor.

The present invention may be realized reduced in various forms such as a brushless motor or a brushless generator; a method for control (or driving method) of these; an actuator using these, an electrical generating device, or a movable body; and so on.

BRIEF DESCRIPTION OF THE DRAWINGS

FIG. 7 shows a configuration of a phase A driver circuit and a phase B driver circuit included in the driver circuit.

FIGS. 8A-8E illustrate internal configuration and operation of the drive controller.

FIG. 15 depicts another configuration example of the phase A driver circuit and the phase B driver circuit included in the driver circuit.

DESCRIPTION OF THE PREFERRED EMBODIMENT

Preferred embodiments of the present invention will be described in the following order.

A. Overview of Motor Configuration and Operation of Embodiment 1
B. Configuration of Drive Circuit Unit
C. Modification Example of Motor Configuration of Embodiment 1
D. Motor Configuration of Embodiment 2
E. Motor Configuration of Embodiment 3
F. Modification Examples

A. OVERVIEW OF MOTOR CONFIGURATION AND OPERATION OF EMBODIMENT 1

Figure 1A:
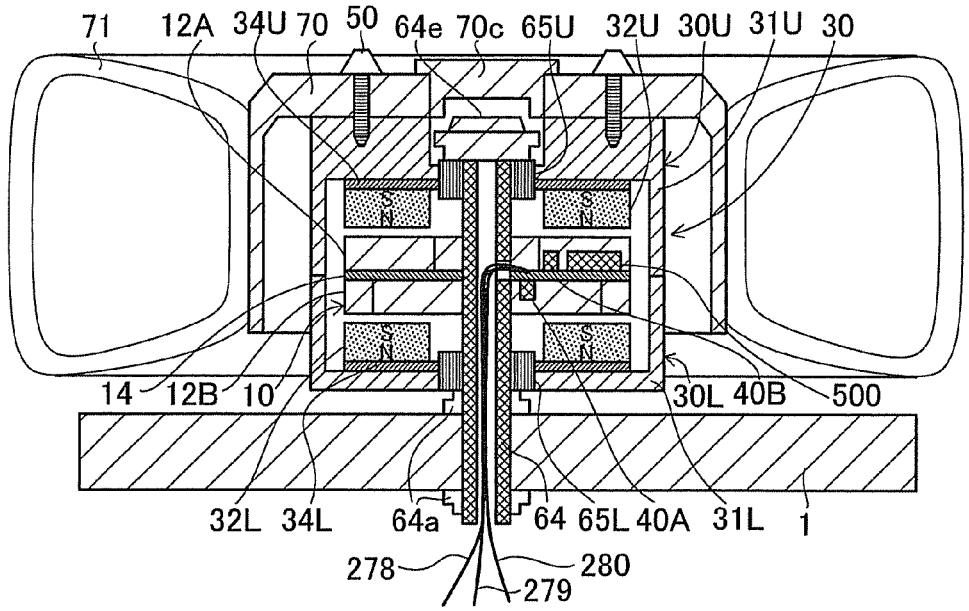
FIGS. 1A-1D are cross section diagrams showing the configuration of the motor main unit of the brushless motor as a first embodiment of this invention.
Figure 1B:
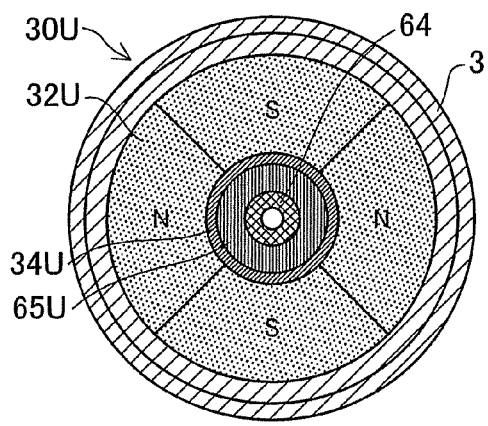

FIGS. 1A-1D are cross section diagrams showing the configuration of the motor main unit of the brushless motor as a first embodiment of this invention. This motor main unit has an axis unit 64, a stator unit 10, and a rotor unit 30. The stator unit 10 and the rotor unit 30 have a roughly round-disk shape. The axis unit 64 is attached to a suspension 1 of a movable body such as a vehicle or the like by an axis fixing unit 64a, and the axis unit 64 is fixed so that the axis unit 64 itself does not rotate. The rotor unit 30 has an upper rotor unit 30U and a lower rotor unit 30L. FIG. 1B is a horizontal cross section diagram of the upper rotor unit 30U. The upper rotor unit 30U has an upper rotational casing unit 31U, a bearing unit 65U, and four permanent magnets 32U each having generally fan-shaped contours. The rotor unit 30 can rotate around the axis unit 64 with the aid of the bearing unit 65U. The bearing unit 65U may be realized by a ball bearing, for example. The lower rotor unit 30L is identical in design to the upper rotor unit 30U and has been omitted from the illustration. The direction of magnetization of the magnets 32U, 32L is parallel to the axis unit 64. The axis-end-part fixing member 64e is attached to the end part of the axis unit 64 (FIG. 1A), such that the bearing unit 65U does not come off due to rotation of the motor. A wheel unit 70 is fixed on the upper rotational casing unit 31U by a fixing screw 50. A sealing cap 70c is attached to the center part of the wheel unit 70. The sealing cap 70c prevents foreign matter from getting into the inside of the motor. A wheel part 71, which acts as the wheel of the movable body, is attached on the outer periphery of the wheel unit 70.

Figure 1C:
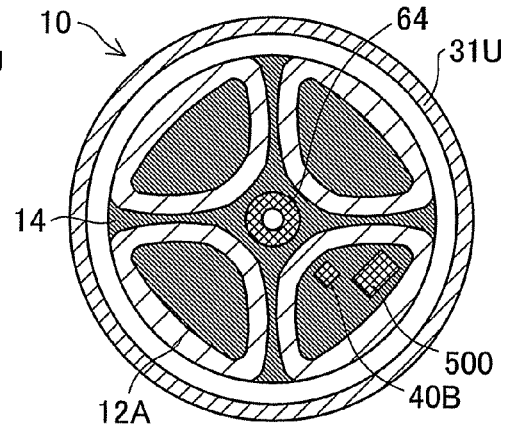

FIG. 1C is a horizontal sectional view of the stator unit 10. As shown in FIG. 1A, the stator unit 10 has a plurality of phase A coils 12A, a plurality of phase B coils 12B, and a support member 14 supporting these coils 12A, 12B. FIG. 1C depicts the phase A coils 12A. In this example, there are provided four phase A coils 12A each of which is wound in a fan-shaped configuration. The phase B coils 12B have this same design. A drive circuit unit 500 is installed in the stator unit 10 as well. As shown in FIG. 1A, it is preferable that the center part of the axis unit 64 has a hollow structure, which provides a passage for a drive power wire 278 for supplying power to each coil 12 and a control wire 279 for sending signals to the drive circuit unit 500. Also, in order to collect regenerated power from each coil 12 (this will be described later), it is preferable to pass a receiving power wire 280 (hereafter also called the "power source wiring 280") through the hollow part. This saves space for the wiring.

Using a motor of the kind of configuration described above, the rotor unit 30 rotates around the axis unit 64, the rotor unit 30 spins the wheel, and the axis unit 64 is fixed and does not rotate (FIG. 1A). Therefore, twisting force is not applied to the axis unit 64. Because of this, it is possible to reduce the torsional strength of the axis unit 64, thereby making the motor lighter. Since there is no torsion on the axis unit 64, it is not necessary to use a transmission means such as gears. This results in no transmission loss, stable control and high-speed response. This is especially effective for postural control which requires fast response of forward rotation and reverse rotation.

While at maintenance work of this motor, it is possible to detach the motor together with axis unit 64 from the suspension 1 by undoing the axis fixing unit 64a. So it is possible to easily disassemble the upper and lower rotor units 30U and 30L. Therefore, the maintainability of overall members is excellent, including the wheel part 71, the wheel unit 70, the axis unit 64, the stator unit 10, and the rotor unit 30. Because it is easy to replace the stator unit 10 and the rotor unit 30 with a stator unit and a rotor unit having other characteristics, it is possible to easily change or improve the motivity characteristics of the movable body. Furthermore, the wheel unit 70 and the wheel part 71 can easily be attached to the rotor unit 30 and be detached from the rotor unit 30 by using the fixing screw unit 50, so it is possible to do maintenance of the wheel unit 70 and the wheel part 71 separated from the motor main unit. Also note that it is possible to transfer the heat generated within the rotor unit 30 to outside of the motor using the upper rotational casing unit 31U as a heat dissipation structure. Therefore, the motor of this embodiment has the advantage of high heat dissipation.

Furthermore, as shown in FIG. 1A, when the stator unit 10 is completely covered with the upper and lower rotational casing units 31U and 31L, it is possible to easily realize a sealed structure that is resistant to dirt and the like from the outside. The sealed structure will make it possible to use this motor as the wheel of an amphibious vehicle. The sealed structure also prevents dust or the like from penetrating inside of the motor, so it is possible to realize a maintenance-free fan motor. Note that the wheel unit 70 and the wheel part 71 correlate to the "driven member" of this invention.

Figure 1D:
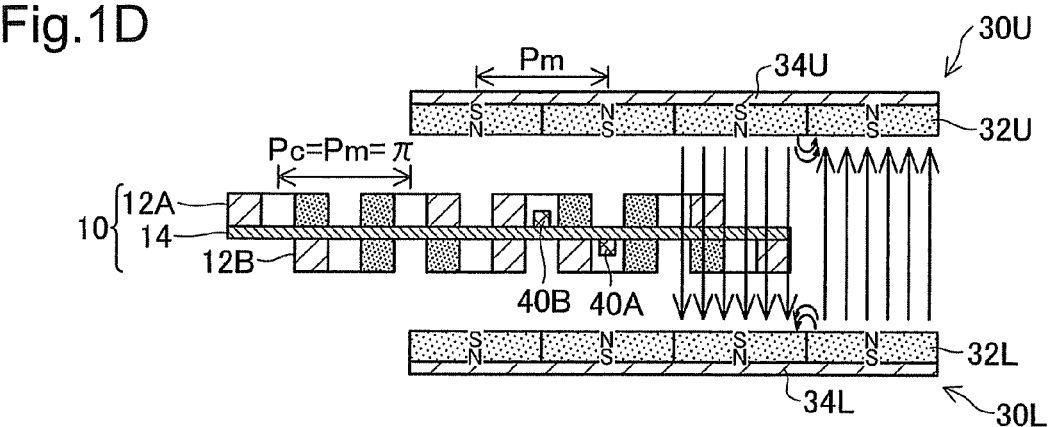

FIG. 1D is a conceptual diagram depicting the relationship of the stator unit 10 and the upper and lower rotor units 30U, 30L. However, the rotational casing unit 31 and the bearing unit 65 of the rotor unit 30 are omitted from this diagram. On the support member 14 of the stator unit 10 are provided a magnetic sensor 40A for phase A use and a magnetic sensor 40B for phase B use. The magnetic sensors 40A, 40B are used to detect the position of the rotor units 30U, 30L (i.e. the phase of the motor). These sensors will hereinafter be referred to as the "phase A sensor" and the "phase B sensor." The phase A sensor 40A is positioned at a center location between two of the phase A coils 12A. Similarly, the phase B sensor 40B is positioned at a center location between two of the phase B coils 12B. In this example, the phase B sensor 40B is positioned together with the phase A coils 12A at the upper face of the support member 14, but it could instead be positioned at the lower face of the support member 14. This applies to the phase A sensor 40A as well. As will be understood from FIG. 1C, in this embodiment, the phase B sensor 40B is positioned inside one of the phase A coils 12A, which has the advantage of ensuring space for placement of the sensor 40B.

As shown in FIG. 1D, the magnets 32U, 32L are each positioned at a constant magnetic pole pitch Pm, with adjacent magnets being magnetized in opposite directions. The phase A coils 12A are arranged at constant pitch Pc, with adjacent coils being excited in opposite directions. This applies to the phase B coils 12B as well. In the present embodiment, the magnetic pole pitch Pm is equal to the coil pitch Pc, and in terms of electrical angle is equivalent to $\pi$. An electrical angle of $2\pi$ is associated with the mechanical angle or distance of displacement when the phase of the drive signal changes by $2\pi$. In the present embodiment, when the phase of the drive signal changes by $2\pi$, the rotor units 30U, 30D undergo displacement by the equivalent of twice the magnetic pole pitch Pm. The phase A coils 12A and the phase B coils 12B are positioned at locations phase-shifted by $\pi/2$ from each other.

The magnets 32U of the upper rotor unit 30U and the magnets 32L of the lower rotor unit 30L are positioned with their magnetic poles which face towards the stator unit 10 having mutually different polarity (N pole and S pole). In other words, the magnets 32U of the upper rotor unit 30U and the magnets 32L of the lower rotor unit 30L are positioned with their opposite poles facing one another. As a result, as shown at the right end in FIG. 1D, the magnetic field between these magnets 32U, 32L will be represented by substantially straight magnetic field lines and will be closed between these magnets 32U, 32L. It will be appreciated that this closed magnetic field is stronger than the open magnetic field. As a result, magnetic field utilization efficiency will be higher, and it will be possible to improve motor efficiency. In preferred practice, magnetic yokes 34U, 34L made of a ferromagnetic body will be disposed respectively on the outside faces of the magnets 32U, 32L. The magnetic yokes 34U, 34L make it possible to further strengthen the magnetic field in the coils. However, the magnetic yokes 34U, 34L may be omitted.

Among the coils 12A and 12B, the magnetic sensors 40A and 40B, and the drive circuit unit 500, it is preferable to cover any or all of these with resin. By doing this, it is possible to suppress the corrosion of these. Also, if the resin covering the coils 12A, 12B is in contact with the axis unit 64, the heat generated from the coils 12A and 12B is conveyed to the axis unit 64, and it becomes possible to cool the coils 12A, 12B by using the axis unit 64 as the heat sink.

Figure 2A:
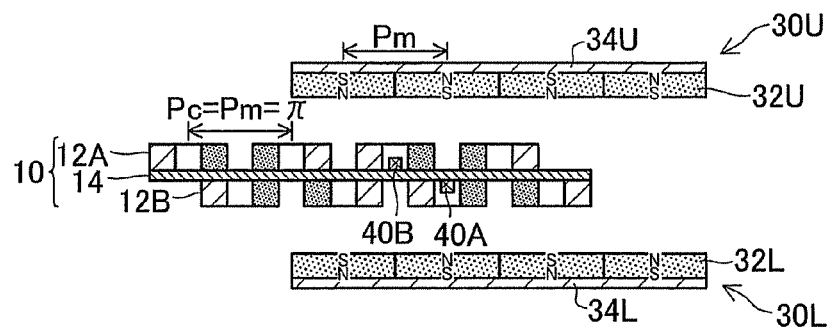
FIGS. 2A-2D illustrate the relationship of sensor output and back electromotive force waveform.
Figure 2B:
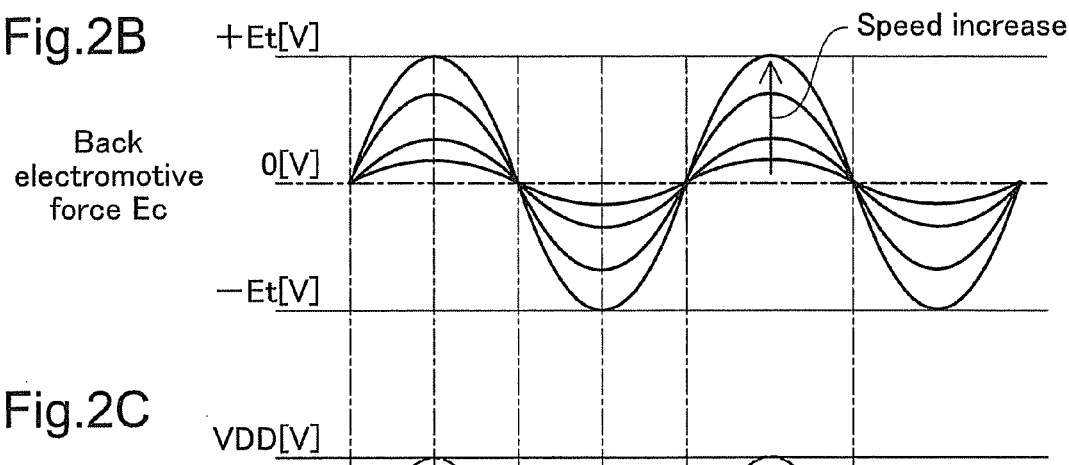
Figure 2C:
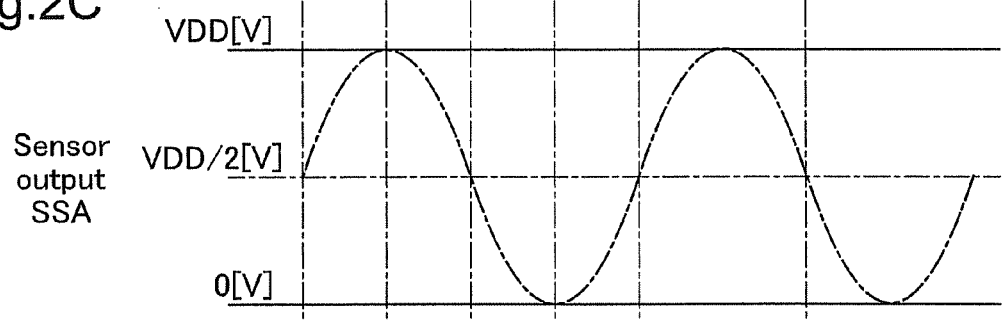
Figure 2D:
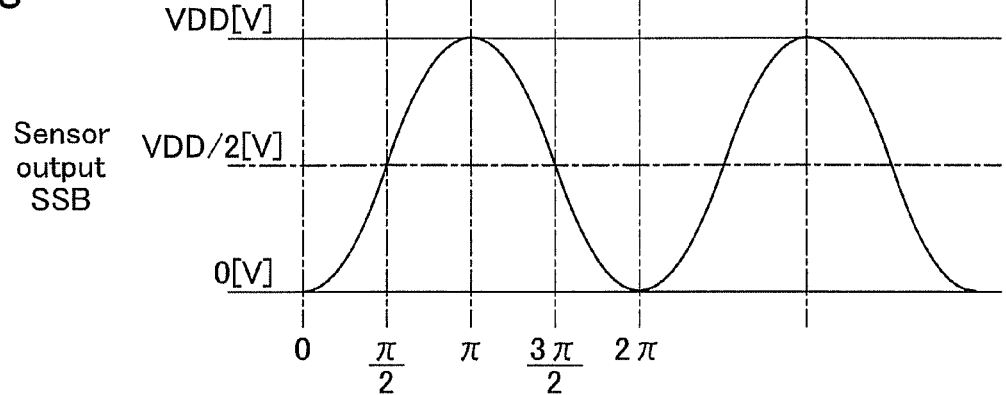

FIGS. 2A-2D illustrate the relationship of sensor output and back electromotive force waveform. FIG. 2A is identical to FIG. 1D. FIG. 2B shows an exemplary waveform of back electromotive force generated by the phase A coils 12A. FIGS. 2C and 2D show exemplary waveforms of sensor outputs SSA, SSB of the phase A sensor 40A and the phase B sensor 40B. These sensors 40A, 40B can generate sensor outputs SSA, SSB of shape substantially similar to the back electromotive force of the coils during motor operation. The back electromotive force of the coils 12A shown in FIG. 2B tends to rise together with motor speed but its waveform shape (sine wave) maintains substantially similar shape. Hall ICs that utilize the Hall effect, for example, could be employed as the sensors 40A, 40B. In this example, the sensor output SSA and the back electromotive force Ec are each a sine wave or waveform approximating a sine wave. As will be discussed later, the drive control circuit of this motor, utilizing the sensor outputs SSA, SSB, applies voltage of shape substantially similar to the back electromotive force Ec to the respective coils 12A, 12B.

An electric motor functions as an energy conversion device that converts between mechanical energy and electrical energy. The back electromagnetic force of the coils represents mechanical energy of the electric motor converted to electrical energy. Consequently, where electrical energy applied to the coils is converted to mechanical energy (that is, where the motor is driven), it is possible to drive the motor with maximum efficiency by applying voltage of similar waveform to the back electromagnetic force. As will be discussed below, "voltage of similar waveform to the back electromagnetic force" means voltage that generates current flowing in the opposite direction from the back electromagnetic force.

Figure 3A:
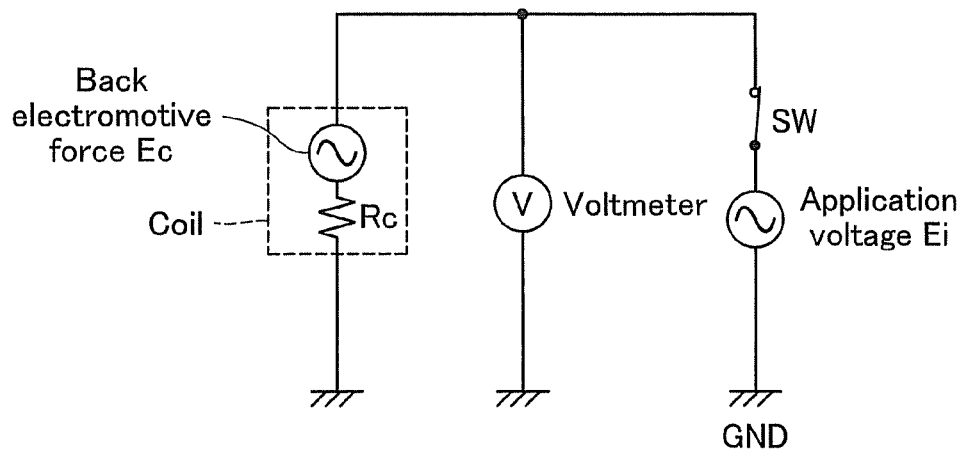
FIGS. 3A and 3B are model diagrams illustrating the relationship of applied voltage and electromotive force of a coil.

FIG. 3A is a model diagram illustrating the relationship of applied voltage and electromotive force of a coil. Here, the coil is simulated in terms of AC back electromotive force Ec and resistance Rc. In this circuit, a voltmeter V is parallel-connected to the AC application voltage Ei and the coil. The back electromotive force Ec is also termed "induced voltage Ec" and the application voltage Ei is also termed "exciting voltage Ei." When AC voltage Ei is applied to the coil to drive the motor, back electromotive force Ec will be generated a direction of current flow opposite that of the application voltage Ei. When a switch SW is opened while the motor is rotating, the back electromotive force Ec can be measured with the voltmeter V. The polarity of the back electromotive force Ec measured with the switch SW open will be the same as the polarity of the application voltage Ei measured with the switch SW closed. The phrase "application of voltage of substantially similar waveform to the back electromagnetic force" herein refers to application of voltage having the same polarity as, and waveform of substantially similar shape to, the back electromotive force Ec measured by the voltmeter V.

Figure 3B:
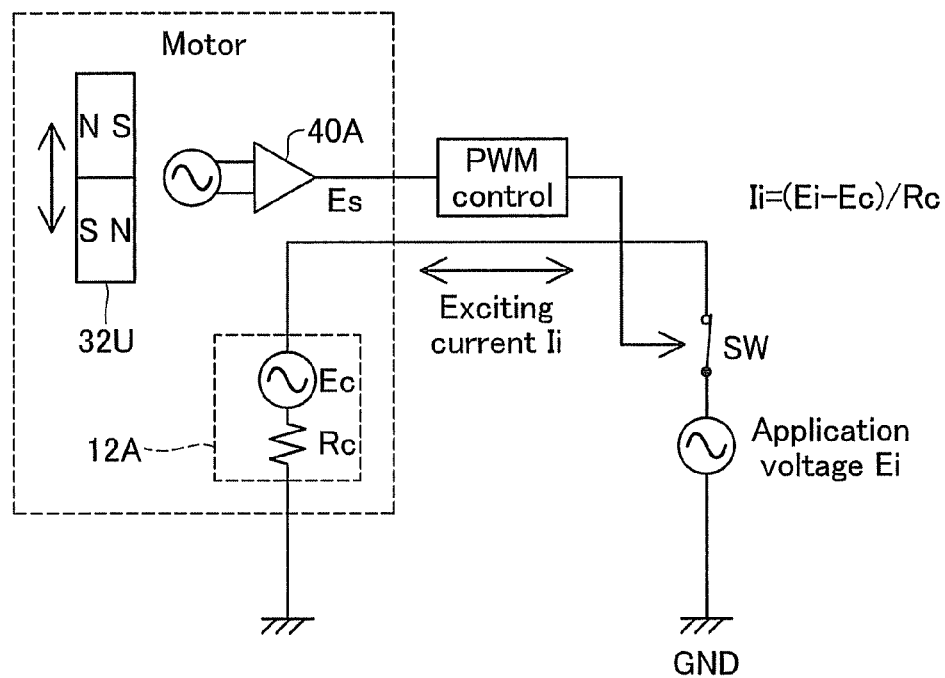

FIG. 3B illustrates an overview of the driving method employed in the present embodiment. Here, the motor is simulated by the phase A coils 12A, the permanent magnets 32U, and the phase A sensor 40A. When the rotor unit 30 having the permanent magnets 32U turns, AC voltage Es (also termed "sensor voltage Es") is generated in the sensor 40A. This sensor voltage Es has a waveform shape substantially similar to that of the induced voltage Ec of the coil 12A. Thus, by generating PWM signal which simulates the sensor voltage Es for on/off control of the switch SW it will be possible to apply to the coils 12A exciting voltage Ei of substantially similar waveform to the induced voltage Ec. The exciting current Ii at this time will be given by Ii=(Ei−Ec)/Rc.

As noted previously, when driving a motor, it is possible to drive the motor with maximum efficiency through application of voltage of waveform similar to that of the back electromagnetic force. It can be appreciated that energy conversion efficiency will be relatively low in proximity to the midpoint (in proximity to 0 voltage) of the sine wave waveform of back electromotive force, while conversely energy conversion efficiency will be relatively high in proximity to the peak of the back electromotive force waveform. Where a motor is driven by applying voltage of waveform similar to that of the back electromotive force, relatively high voltage can be applied during periods of high energy conversion efficiency, thereby improving efficiency of the motor. On the other hand, if the motor is driven with a simple rectangular waveform for example, considerable voltage will be applied in proximity to the position where back electromotive force is substantially 0 (midpoint) so motor efficiency will drop. Also, when voltage is applied during such periods of low energy conversion efficiency, due to eddy current vibration will be produced in directions other than the direction of rotation, thereby creating a noise problem.

As will be understood from the preceding discussion, the advantages of driving a motor through application of voltage of similar waveform to the back electromotive force are improved motor efficiency and reduced vibration and noise.

Figure 4A:
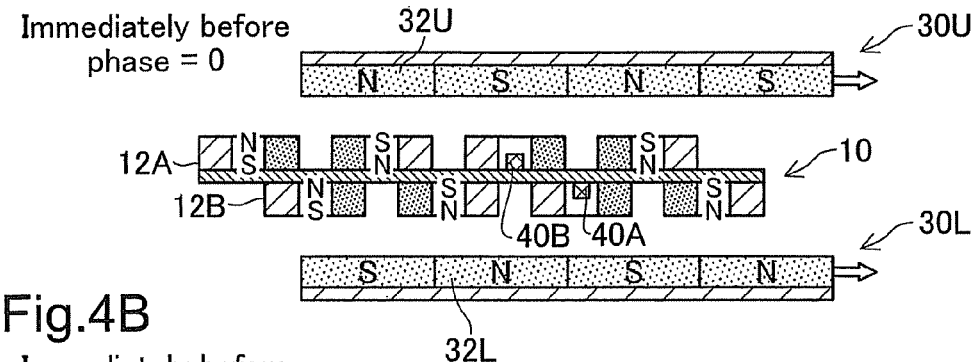
FIGS. 4A-4D are illustrations depicting forward rotation operation of the brushless motor of the embodiment.
Figure 4B:
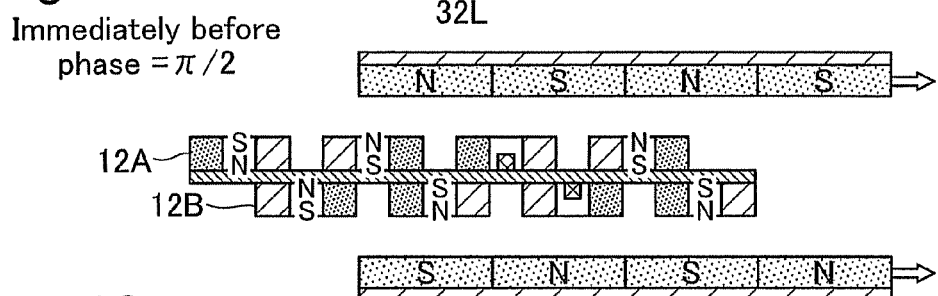
Figure 4C:
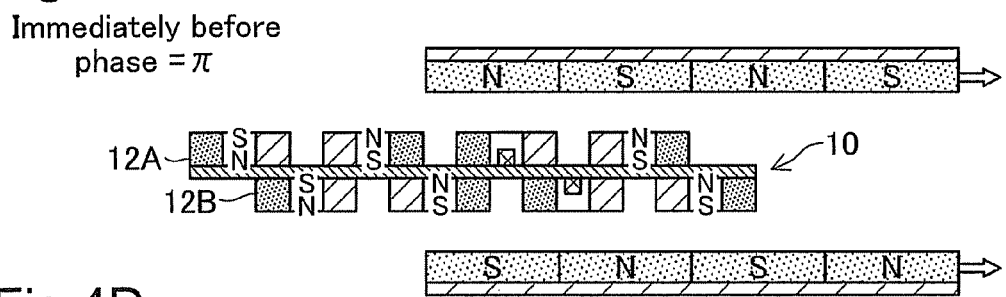
Figure 4D:
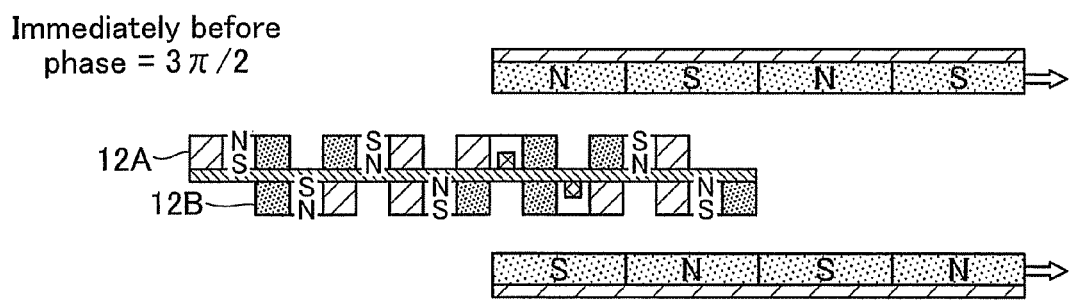
Figure 5A:
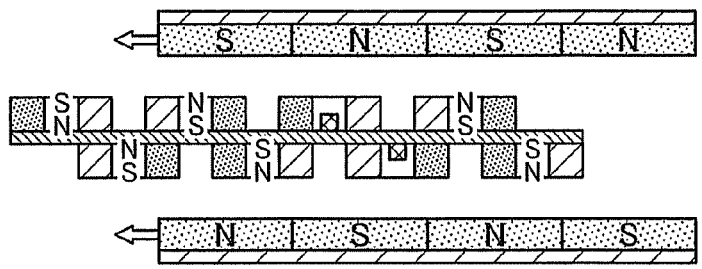
FIGS. 5A-5D are illustrations depicting reverse rotation operation of the brushless motor of the embodiment.
Figure 5B:
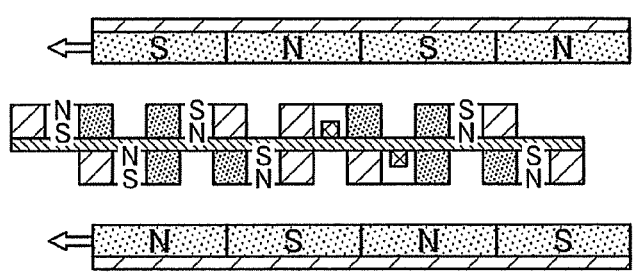
Figure 5C:
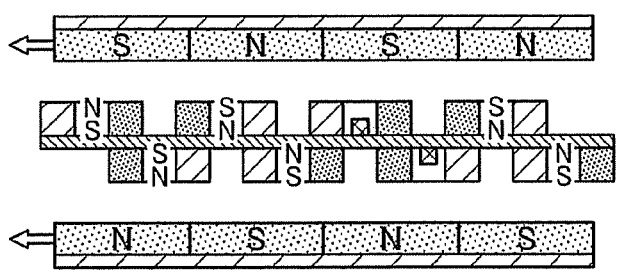
Figure 5D:
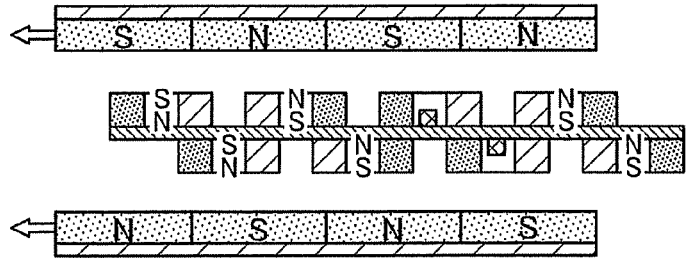

FIGS. 4A-4D are illustrations depicting forward rotation operation of the brushless motor of the embodiment. FIG. 4A depicts the state just before the phase reaches 0. The letters "N" and "S" shown at locations of the phase A coils 12A and the phase B coils 12B indicate the excitation direction of these coils 12A, 12B. When the coils 12A, 12B are excited, forces of attraction and repulsion are generated between the coils 12A, 12B and the magnets 32U, 32L. As a result, the rotor units 30U, 30L turn in the forward rotation direction (rightward in the drawing). At the timing of the phase going to 0, the excitation direction of the phase A coils 12A reverses (see FIGS. 2A-2D). FIG. 4B depicts a state where the phase has advanced to just before π/2. At the timing of the phase going to π/2, the excitation direction of the phase B coils 12B reverses. FIG. 4C depicts a state where the phase has advanced to just before π. At the timing of the phase going to π, the excitation direction of the phase A coils 12B again reverses. FIG. 4D depicts a state where the phase has advanced to just before 3π/2. At the timing of the phase going to 3π/2, the excitation direction of the phase B coils 12B again reverses.

As will be apparent from FIGS. 2C and 2D as well, at times at which the phase equals an integral multiple of π/2 the sensor outputs SSA, SSB will go to zero, and thus driving force will be generated from only one of the two sets of coils 12A, 12B. However, during all periods except for times at which the phase equals integral multiples of π/2, it will be possible for the sets of coils 12A, 12B of both phases to generate driving force. Consequently, high torque can be generated using the sets of coils 12A, 12B of both phases.

As will be apparent from FIG. 4A, the phase A sensor 40A is positioned such that the location at which the polarity of its sensor output switches will be situated at a location where the center of a phase A coil 12A faces the center of a permanent magnet 32U. Similarly, the phase B sensor 40B is positioned such that the location at which the polarity of the sensor output switches will be situated at a location where the center of a phase B coil 12A faces the center of a permanent magnet 32L. By positioning the sensors 40A, 40B at these locations, it will be possible to generate from the sensors 40A, 40B the sensor outputs SSA, SSB (FIGS. 2C and 2D) which have substantially similar waveform to the back electromotive force of the coils.

FIG. 5A-5D are illustrations depicting reverse rotation operation of the brushless motor of the embodiment. FIG. 5A-5D respectively depicts states where the phase has reached just before 0, π/2, π, and 3/π2. Reverse rotation operation can be accomplished, for example, by reversing the polarity of the drive voltages of the coils 12A, 12B to from that of the respective drive voltages during forward rotation operation.

B. CONFIGURATION OF DRIVE CIRCUIT UNIT

Figure 6:
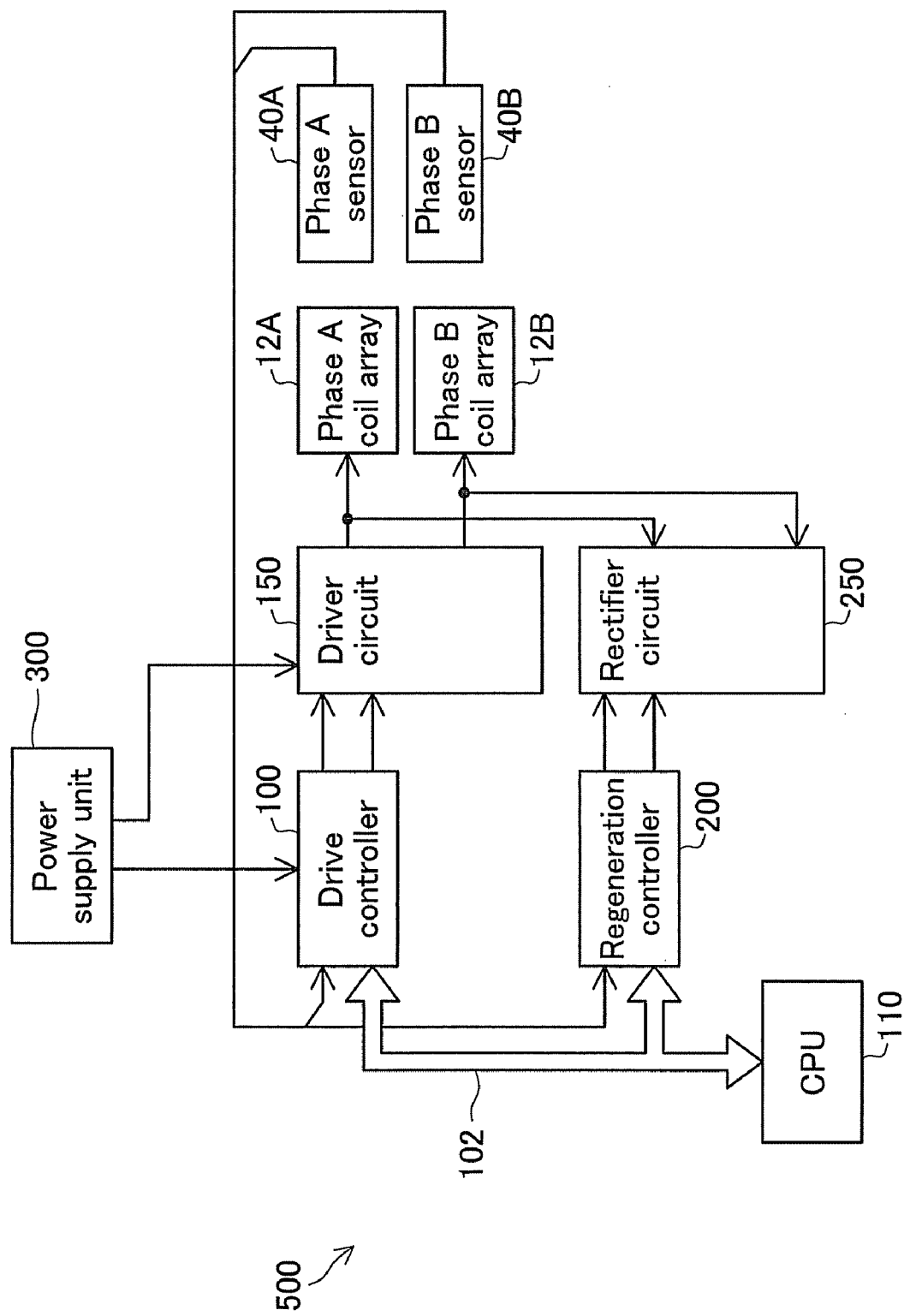
FIG. 6 is a block diagram depicting an internal configuration of a drive circuit unit in the present embodiment.

FIG. 6 is a block diagram depicting an internal configuration of a drive circuit unit in the present embodiment. The drive circuit unit 500 has a CPU 110, a drive controller 100, a regeneration controller 200, a driver circuit 150, a rectifier circuit 250, and a power supply unit 300. The two controllers 100, 200 are connected to the CPU 110 via a bus 102. The drive controller 100 and the driver circuit 150 are circuits for carrying out control in instances where driving force is to be generated in the electric motor. The regeneration controller 200 and the rectifier circuit 250 are circuits for carrying out control in instances where power from the electric motor is to be regenerated. The regeneration controller 200 and the rectifier circuit 250 will be referred to collectively as a "regeneration circuit." The drive controller 100 will also be referred to as a "drive signal generating circuit." The power supply unit 300 is a circuit for supplying various power supply voltages to other circuits in the drive circuit unit 500. In FIG. 6, for convenience, only the power lines going from the power supply unit 300 to the drive controller 100 and the driver circuit 150 are shown; power lines leading to other circuits have been omitted.

FIG. 7 shows a configuration of a phase A driver circuit 120A and a phase B driver circuit 120B included in the driver circuit 150 (FIG. 6). The phase A driver circuit 120A is an H bridge circuit for delivering AC drive signals DRVA1, DRVA2 to the phase A coils 12A. The white circles next to terminal portions of blocks which indicate drive signals denote negative logic and indicate that the signal is inverted. The arrows labeled IA1, IA2 respectively indicate the direction of current flow with the A1 drive signal DRVA1 and the A2 drive signal DRVA2. The configuration of the phase B driver circuit 120B is the same as the configuration of the phase A driver circuit 120A.

FIGS. 8A-8E illustrate internal configuration and operation of the drive controller 100 (FIG. 6). The drive controller 100 has a basic clock generating circuit 510, a 1/N frequency divider 520, a PWM unit 530, a moving direction register 540, a multiplier 550, an encoder unit 560, an AD converter 570, a voltage control value register 580, and an excitation interval setting unit 590. The drive controller 100 generates both phase A drive signals and phase B drive signal, and the basic clock generating circuit 510, the divider 520, and the moving direction register 540 are used in common by both the phase-A and phase-B. FIG. 8A only depicts circuitry for phase A, for convenience of illustration. The same circuitry for phase B is also included in the drive controller 100. The other constitutional elements that exist respectively for the phase-A and phase-B are depicted only as the phase-A circuit constitution in FIG. 8A for convenience of illustration. But the same constitutional elements as those for the phase A are also provided in the drive controller 100 for the phase B.

The basic clock generating circuit 510 generates a clock signal PCL of prescribed frequency, and includes a PLL circuit for example. The frequency divider 520 generates a clock signal SDC having a frequency equal to 1/N the frequency of the clock signal PCL. The value of N is set to a prescribed constant. This value of N has been previously established in the frequency divider 520 by the CPU 110. The PWM unit 530 generates the AC single-phase drive signals DRVA1, DRVA2 (FIG. 7) based on the clock signals PCL, SDC, a multiplication value Ma supplied by the multiplier 550, a forward/reverse direction value RI supplied by the moving direction register 540, a positive/negative sign signal Pa supplied by the encoder unit 560, and an excitation interval signal Ea supplied by the excitation interval setting unit 590. This operation will be discussed later.

A value RI indicating the direction for motor rotation is established in the moving direction register 540, by the CPU 110. In the present embodiment, the motor will rotate forward when the forward/reverse direction value RI is L level, and rotate in reverse rotation when H level. The other signals Ma, Pa, Ea supplied to the PWM unit 530 are determined as follows.

The output SSA of the magnetic sensor 40 is supplied to the AD converter 570. This sensor output SSA has a range, for example, of from GND (ground potential) to VDD (power supply voltage), with the middle point thereof (=VDD/2) being the π phase point of the output waveform, or the point at which the sine wave passes through the origin. The AD converter 570 performs AD conversion of this sensor output SSA to generate a digital value of sensor output. The output of the AD converter 570 has a range, for example, of FFh to 0h (the "h" suffix denotes hexadecimal), with the median value of 80h corresponding to the middle point of the sensor waveform.

The encoder unit 560 converts the range of the sensor output value subsequent to the AD conversion, and sets the value of the middle point of the sensor output value to 0. As a result, the sensor output value Xa generated by the encoder unit 560 assumes a prescribed range on the positive side (e.g. between +127 and 0) and a prescribed range on the negative side (e.g. between 0 and −127). However, the value supplied to the multiplier 560 by the encoder unit 560 is the absolute value of the sensor output value Xa; the positive/negative sign thereof is supplied to the PWM unit 530 as the positive/negative sign signal Pa.

The voltage control value register 580 stores a voltage control value Ya established by the CPU 110. This voltage control value Ya, together with the excitation interval signal Ea discussed later, functions as a value for setting the application voltage to the motor. The value Ya can assume a value between 0 and 1.0, for example. Assuming an instance where the excitation interval signal Ea has been set with no non-excitation intervals provided so that all of the intervals are excitation intervals, Ya=0 will mean that the application voltage is zero, and Ya=1.0 will mean that the application voltage is at maximum value. The multiplier 550 performs multiplication of the voltage control value Ya and the sensor output value Xa output from the encoder unit 560 and conversion to an integer; the multiplication value Ma thereof is supplied to the PWM unit 530.

FIGS. 8B-8E depict operation of the PWM unit 530 in instances where the multiplication value Ma takes various different values. Here, it is assumed that there are no non-excitation intervals, so that all intervals are excitation intervals. The PWM unit 530 is a circuit that, during one period of the clock signal SDC, generates one pulse with a duty factor of Ma/N. Specifically, as shown in FIGS. 8B-8E, the pulse duty factor of the single-phase drive signals DRVA1, DRVA2 increases in association with increase of the multiplication value Ma. The first drive signal DRVA1 is a signal that generates a pulse only when the sensor output SSA is positive and the second drive signal DRVA2 is a signal that generates a pulse only when the sensor output SSA is negative; in FIGS. 8B-8E, both are shown together. For convenience, the second drive signal DRVA2 is shown in the form of pulses on the negative side.

Figure 9A:
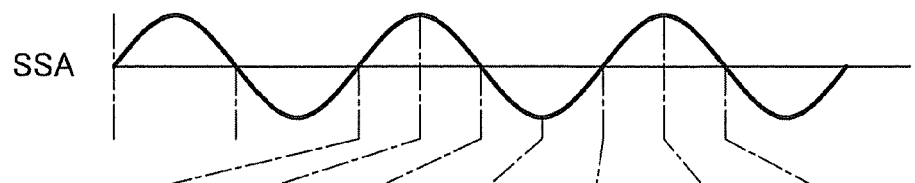
FIGS. 9A-9C depict correspondence between sensor output waveform and waveform of the drive signals generated by the PWM unit.
Figure 9B:
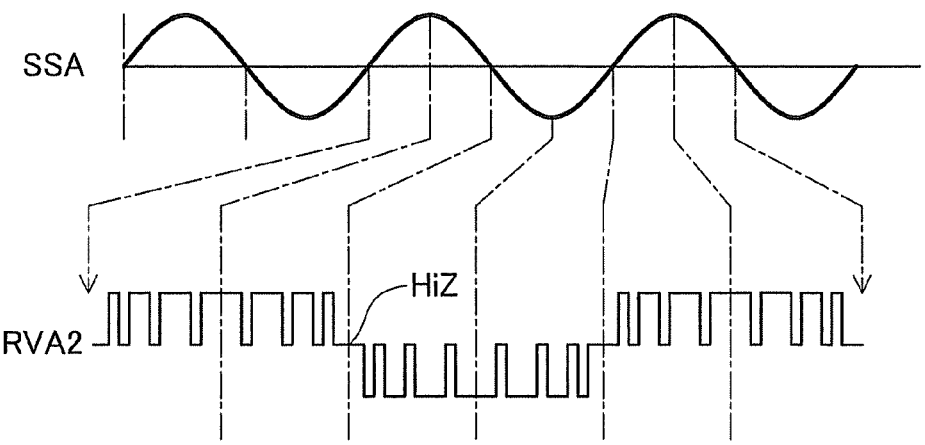
Figure 9C:
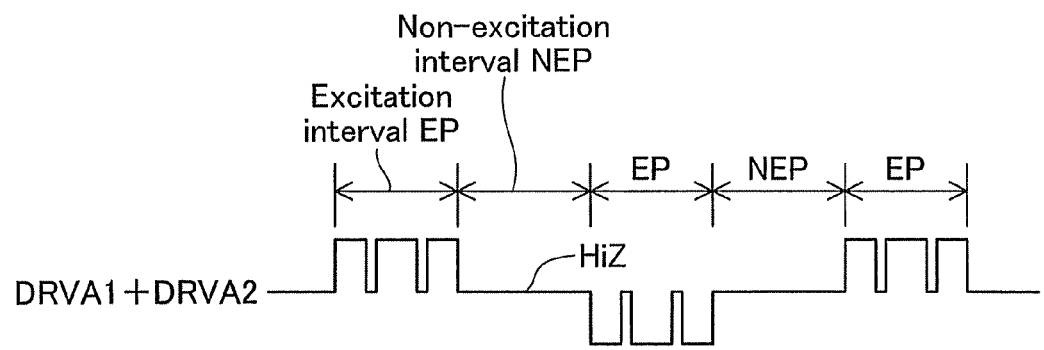

FIGS. 9A-9C depict correspondence between sensor output waveform and waveform of the drive signals generated by the PWM unit 530. In the drawing, "Hiz" denotes a state of high impedance where the magnetic coils are not excited. As described in FIGS. 8B-8E, the single-phase drive signals DRVA1, DRVA2 are generated by PWM control using the analog waveform of the sensor output SSA. Consequently, using these single-phase drive signals DRVA1, DRVA2 it is possible to supply to the coils effective voltage that exhibits changes in level corresponding to change in the sensor outputs SSA.

The PWM unit 530 is constructed such that drive signals are output only during the excitation intervals indicated by the excitation interval signal Ea supplied by the excitation interval setting unit 590, with no drive signals being output at intervals except for the excitation intervals (non-excitation intervals). FIG. 9C depicts drive signal waveforms produced in the case where excitation intervals EP and non-excitation intervals NEP have been established by the excitation interval signal Ea. During the excitation intervals EP, the drive signal pulses of FIG. 9B are generated as is; during the non-excitation intervals NEP, no pulses are generated. By establishing excitation intervals EP and non-excitation intervals NEP in this way, voltage will not be applied to the coils in proximity to the middle point of the back electromotive force waveform (i.e. in proximity to the middle point of the sensor output), thus making possible further improvement of motor efficiency. Preferably the excitation intervals EP will be established at intervals symmetric about the peak point of the back electromotive force waveform; and preferably the non-excitation intervals NEP will be established in intervals symmetric about the middle point (center) of the back electromotive force waveform.

As discussed previously, if the voltage control value Ya is set to a value less than 1, the multiplication value Ma will be decreased in proportion to the voltage control value Ya. Consequently, effective adjustment of application voltage is possible by the voltage control value Ya as well.

As will be understood from the preceding description, with the motor of the present embodiment, it is possible to adjust the application voltage using both the voltage control value Ya and the excitation interval signal Ea. In preferred practice, relationships between desired application voltage on the one hand, and the voltage control value Ya and excitation interval signal Ea on the other, will be stored in advance in table format in memory in the drive circuit unit 500 (FIG. 7). By so doing, when the drive circuit unit 500 has received a target value for the desired application voltage from the outside, it will be possible for the CPU 110, in response to the target value, to set the voltage control value Ya and the excitation interval signal Ea in the drive controller 100. Adjustment of application voltage does not require the use of both the voltage control value Ya and the excitation interval signal Ea, and it would be acceptable to use either one of them instead.

Figure 10:
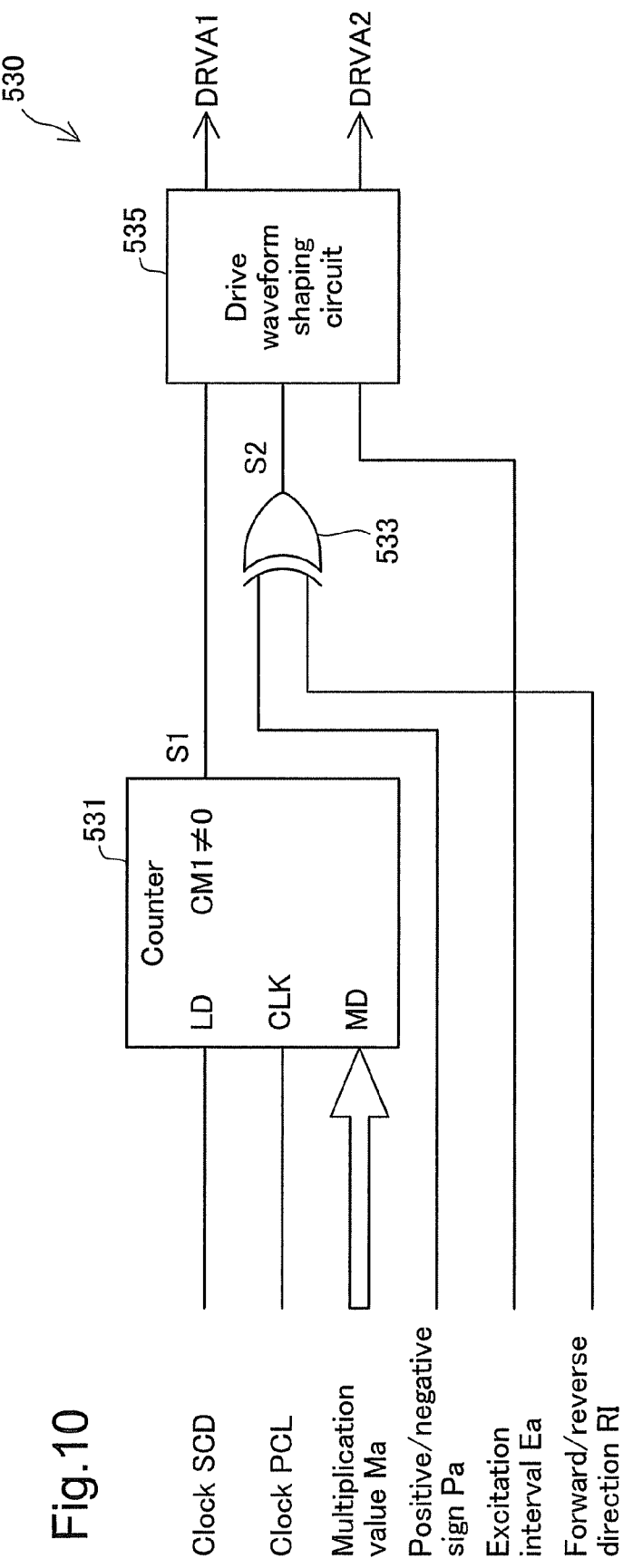
FIG. 10 is a block diagram depicting the internal configuration of the PWM unit.

FIG. 10 is a block diagram depicting the internal configuration of the PWM unit 530 (FIG. 8A). The PWM unit 530 has a counter 531, an EXOR circuit 533, and a drive waveform shaping circuit 535. Their operation will be described below.

Figure 11:
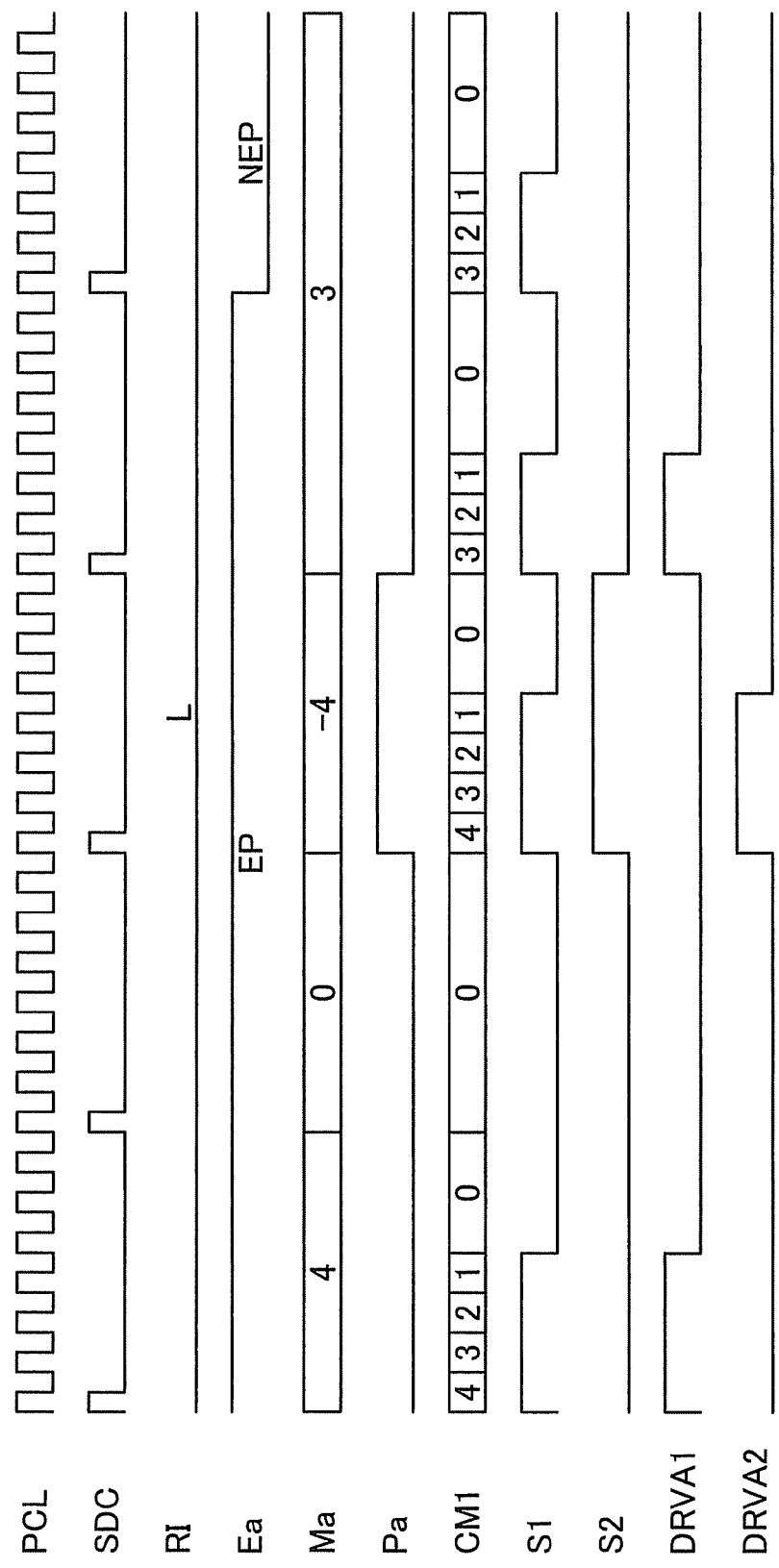
FIG. 11 is a timing chart depicting operation of the PWM unit during forward rotation of the motor.

FIG. 11 is a timing chart depicting operation of the PWM unit 530 during forward rotation of the motor. The drawing show the two clock signals PCL and SDC, the forward/reverse direction value RI, the excitation interval signal Ea, the multiplication value Ma, the positive/negative sign signal Pa, the counter value CM1 in the counter 531, the output S1 of the counter 531, the output S2 of the EXOR circuit 533, and the output signals DRVA1, DRVA2 of the drive waveform shaping circuit 535. For each one cycle of the clock signal SDC, the counter 531 repeats an operation of decrementing the count value CM1 to 0, in sync with the clock signal PCL. The initial value of the count value CM1 is set to the multiplication value Ma. In FIG. 11, for convenience in illustration, negative multiplication values Ma are shown as well; however, the counter 531 uses the absolute values |Ma| thereof. The output S1 of the counter 531 is set to H level when the count value CM1 is not 0, and drops to L level when the count value CM1 is 0.

The EXOR circuit 533 outputs a signal S2 that represents the exclusive OR of the positive/negative sign signal Pa and the forward/reverse direction value RI. Where the motor is rotating forward, the forward/reverse direction value RI will be at L level. Consequently, the output S2 of the EXOR circuit 533 will be a signal identical to the positive/negative sign signal Pa. The drive waveform shaping circuit 535 generates the drive signals DRVA1, DRVA2 from the output S1 of the counter 531 and the output S2 of the EXOR circuit 533. Specifically, in the output S1 of the counter 531, the signal during intervals in which the output S2 of the EXOR circuit 533 is at L level will be output as the drive signal DRVA1, and the signal during intervals in which the output S2 of the EXOR circuit 533 is at H level will be output as the drive signal DRVA2. In proximity to the right edge in FIG. 11, the excitation interval signal Ea falls to L level thereby establishing a non-excitation interval NEP. Consequently, neither of the drive signals DRVA1, DRVA2 will be output during this non-excitation interval NEP, and a state of high impedance will be maintained.

Figure 12:
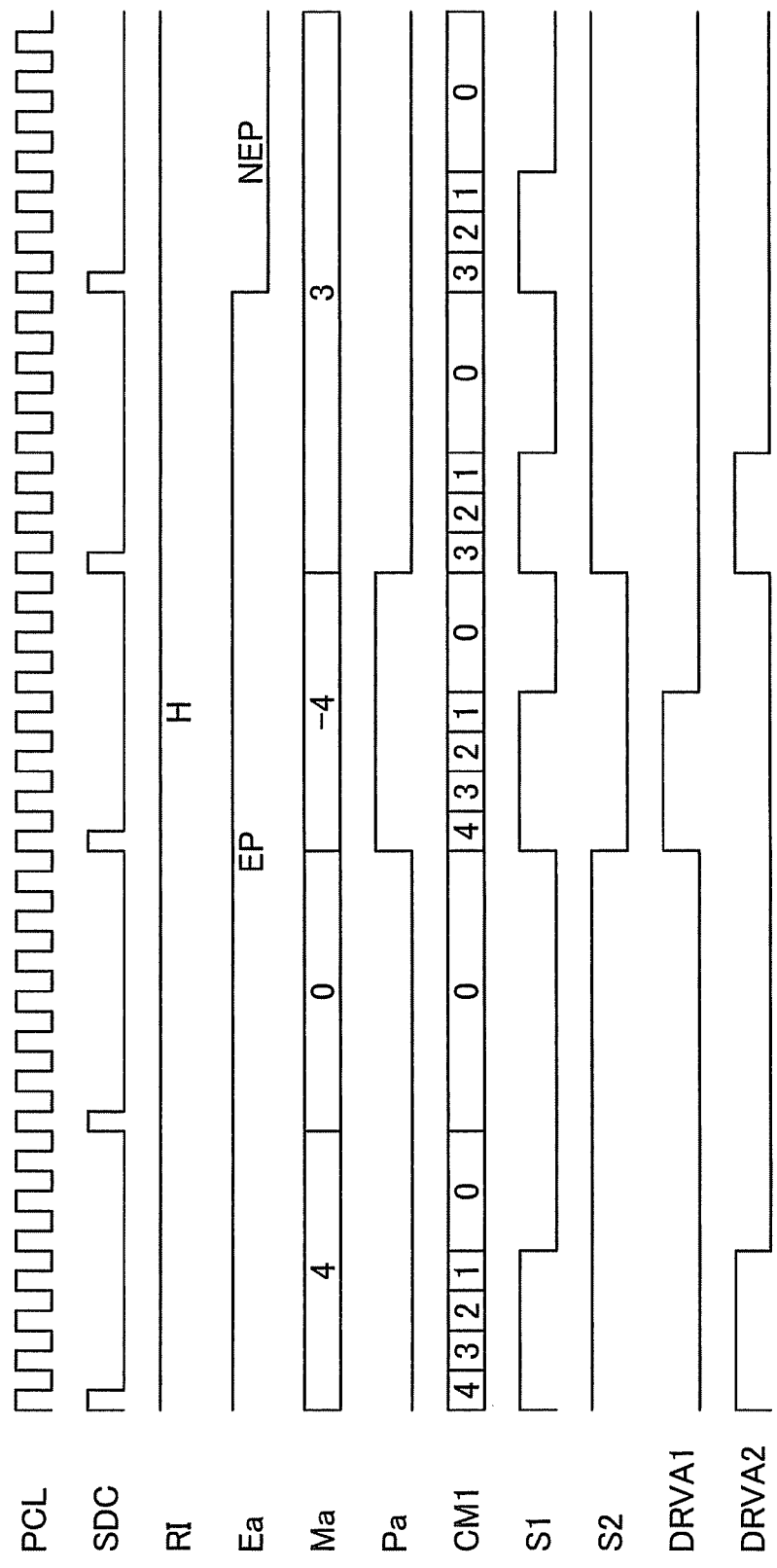
FIG. 12 is a timing chart depicting operation of the PWM unit during reverse rotation of the motor.

FIG. 12 is a timing chart depicting operation of the PWM unit 530 during reverse rotation of the motor. Where the motor is rotating in reverse, the forward/reverse direction value RI will be at H level. As a result, the two drive signals DRVA1, DRVA2 switch relative to FIG. 11, and it will be appreciated that the motor runs in reverse as a result.

Figure 13A:
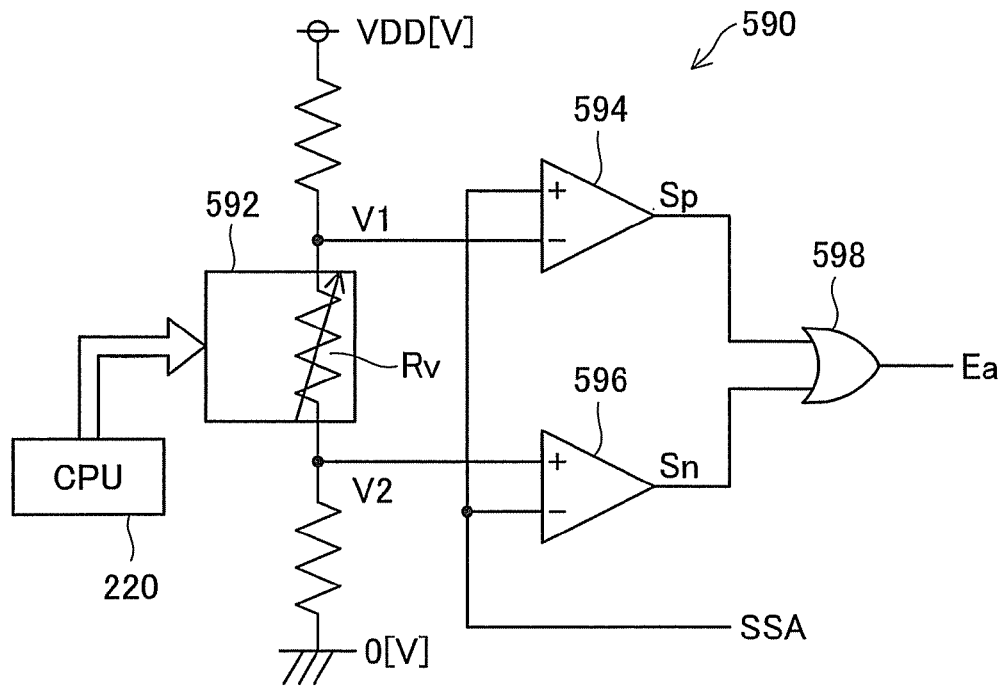
FIGS. 13A and 13B illustrate the internal configuration and operation of an excitation interval setting unit.
Figure 13B:
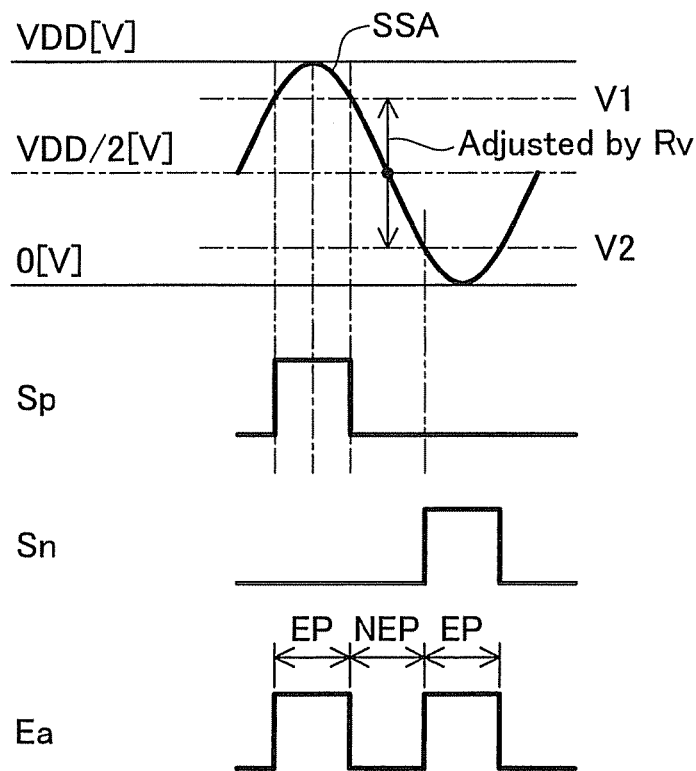

FIGS. 13A and 13B illustrate the internal configuration and operation of an excitation interval setting unit 590. The excitation interval setting unit 590 has an electronic variable resistor 592, a voltage comparators 594, 596, and an OR circuit 598. The resistance Rv of the electronic variable resistor 592 is set by the CPU 110. The voltages V1, V2 at either terminal of the electronic variable resistor 592 are supplied to one of the input terminals of the voltage comparators 594, 596. The sensor output SSA is supplied to the other input terminal of the voltage comparators 594, 596. The output signals Sp, Sn of the voltage comparators 594, 596 are input to the OR circuit 598. The output of the OR circuit 598 is the excitation interval signal Ea, which is used to differentiate excitation intervals and non-excitation intervals.

FIG. 13B depicts operation of the excitation interval setting unit 590. The voltages V1, V2 at the terminals of the electronic variable resistor 592 are modified by adjusting the resistance Rv. Specifically, the terminal voltages V1, V2 are set to values of equal difference from the median value of the voltage range (=VDD/2). In the event that the sensor output SSA is higher than the first voltage V1, the output Sp of the first voltage comparator 594 goes to H level, whereas in the event that the sensor output SSA is lower than the second voltage V2, the output Sn of the second voltage comparator 596 goes to H level. The excitation interval signal Ea is a signal derived by taking the logical sum of the these output signals Sp, Sn. Consequently, as shown at bottom in FIG. 14B, the excitation interval signal Ea can be used as a signal indicating excitation intervals EP and non-excitation intervals NEP. The excitation intervals EP and non-excitation intervals NEP are established by the CPU 110, by adjusting the variable resistance Rv.

Figure 14A:
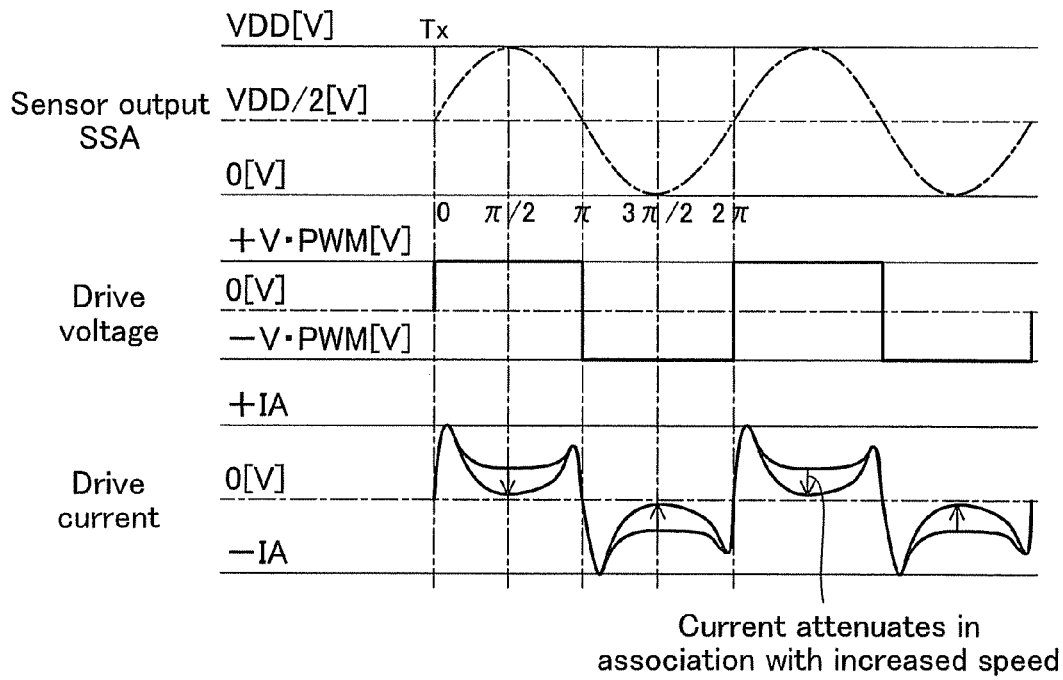
FIGS. 14A and 14B are illustrations comparing various signal waveforms in the case where the motor of the embodiment discussed above is driven by a rectangular wave, and where driven by a sine wave.
Figure 14B:
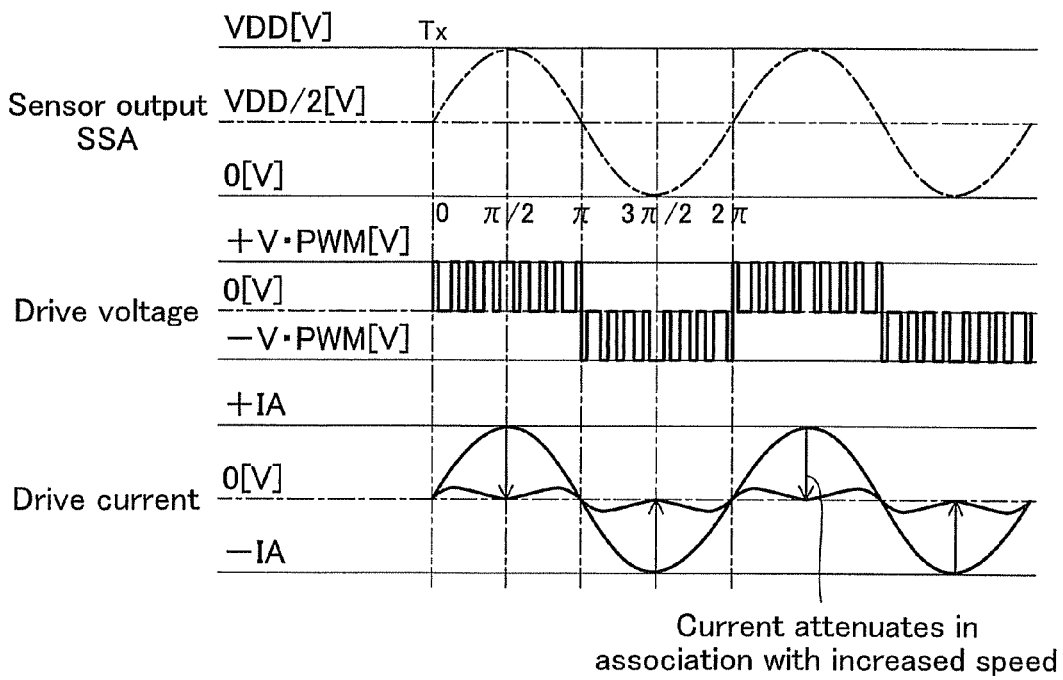

FIGS. 14A and 14B are illustrations comparing various signal waveforms in the case where the motor of the embodiment discussed above is driven by a rectangular wave, and where driven by a sine wave (for descriptive purposes, the waveform of the back electromotive force is also called a sine wave). Where a rectangular wave is employed for driving, a drive voltage of rectangular wave shape is applied to the coils. While the drive current is close to a rectangular wave at startup, it decreases as rotation speed increases. This is because the back electromotive force increases in response to the increased rotation speed (FIG. 2B). With a rectangular wave, however, despite increased rotation speed the current value will not decline appreciably in proximity to the timing of switching of the drive voltage at phase=nπ, so a fairly large current will tend to flow.

On the other hand, where a sine wave is employed for driving, PWM control is employed for the drive voltage so that the effective values of the drive voltage have sine wave shape. While the drive current is close to a sine wave at startup, as rotation speed increases the drive current will decrease due to the effects of back electromotive force. With sine wave driving, the current value declines appreciably in proximity to the timing of switching of the drive voltage polarity at phase=nπ. As discussed in the context of FIGS. 2A-2C, generally speaking the energy conversion efficiency of a motor is low in proximity to the timing of switching of the drive voltage polarity. With sine wave driving, the current value during intervals of low efficiency is lower than with rectangular wave, making it possible to drive the motor more efficiently.

FIG. 15 depicts another configuration example of the phase A driver circuit 120A and the phase B driver circuit 120B included in the driver circuit 150 (FIG. 6). These driver circuits 120A, 120B are furnished with amplifier circuits 122 situated in front of the gate electrodes of the transistors which make up the driver circuits 120A, 120B shown in FIG. 7. While the type of transistor also differs from that in FIG. 7, transistors of any type can be used as the transistors. In order to be able to drive the motor of the present invention over a wider operating range with regard to torque and speed, it will be preferable to establish variable power supply voltage VDD of the driver circuits 120A, 120B. Where the power supply voltage VDD has been changed, the level of the drive signals DRVA1, DRVA2, DRVB1, DRVB2 applied to the gate voltages of the transistors will change proportionally therewith. By so doing the motor can be driven using a wider power supply voltage VDD range. The amplifier circuits 122 are circuits for changing the level of the drive signals DRVA1, DRVA2, DRVB1, DRVB2. In preferred practice the power supply unit 300 of the drive circuit unit 500 shown in FIG. 6 will supply variable power supply voltage VDD to the driver circuit 150.

Figure 16:
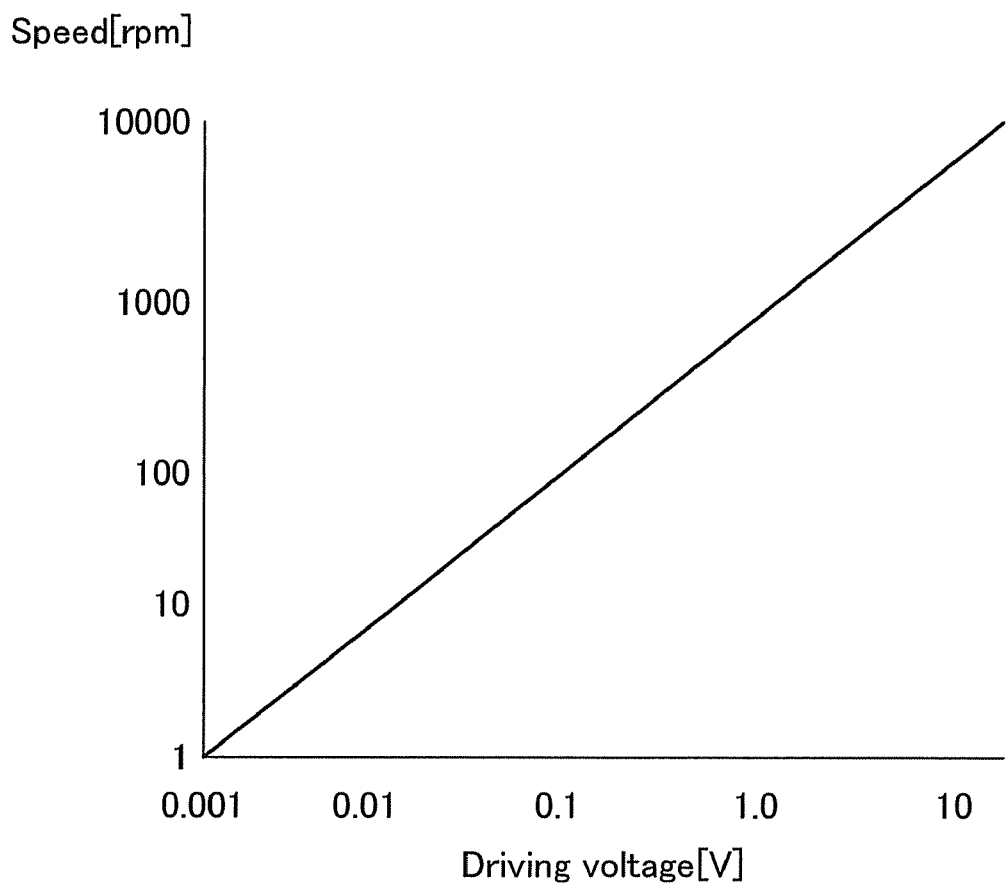
FIG. 16 shows the speed of the motor of the embodiment in the absence of load.

FIG. 16 shows the speed of the motor of the embodiment in the absence of load. As will be apparent from the graph, in the absence of load the motor of the embodiment will rotate at stable speed down to very low speed. The reason is that since there is no magnetic core, cogging does not occur.

Figure 17:
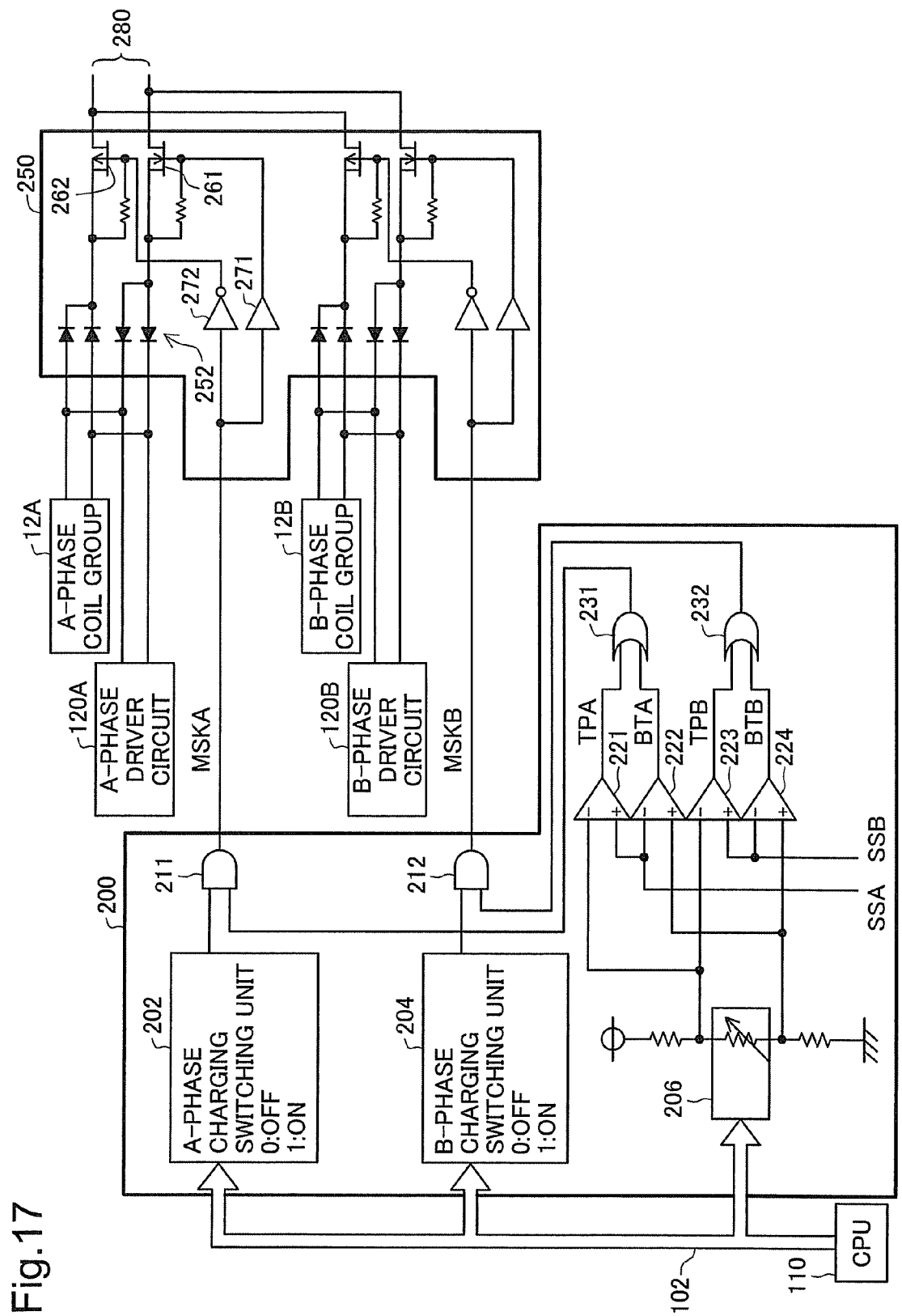
FIG. 17 illustrates the internal configuration of the regeneration controller and rectifier circuit.

FIG. 17 illustrates the internal configuration of the regeneration controller 200 and rectifier circuit 250 shown in FIG. 6. The regeneration controller 200 comprises an phase A charge switching unit 202 and a phase B charge switching unit 204, both connected to the bus 102, and an electronically variable resistor 206. The output signals of the two charge switching units 202, 204 are applied to the input terminals of the two AND circuits 211, 212.

The phase A charge switching unit 202 outputs a signal of a "1" level when the regenerative power from the phase A coils 12A is recovered, and outputs a signal of a "0" level when the power is not recovered. The same is true for the phase B charge switching unit 204. The switching of those signal levels is conducted with the CPU 110. The presence or absence of regeneration from the phase A coils 12A and the presence or absence of regeneration from the phase B coil 12B can be set independently. Therefore, for example, electric power can be regenerated from the phase B coils 12B, while generating a drive force in the motor by using the phase A coils 12A.

The drive controller 100 shown in FIG. 6, similarly, may have a configuration such that whether or not the drive force is generated by using the phase A coils 12A and whether or not the drive force is generated by using the phase B coils 12B can be set independently. In such a case, the motor can be operated in an operation mode such that a drive force is generated in any one of the two sets of coils 12A, 12B, while electric power is regenerated in the other coils.

The voltage across the electronically variable resistor 206 is applied to one of the two input terminals of the four voltage comparators 221-224. The phase A sensor signal SSA and phase B sensor signal SSB are applied to the other input terminal of the voltage comparators 221-224. The output signals TPA, BTA, TPB, BTB of the four voltage comparators 221-224 can be called "mask signals" or "permission signals".

The mask signals TPA, BTA for the phase A coils are inputted into the OR circuit 231, and the mask signals TPB, BTB for the phase B are inputted into the other OR circuit 232. The outputs of those OR circuits 231, 232 are supplied to the input terminals of the above-mentioned two AND circuits 211, 212. The output signals MSKA, MSKB of those AND circuits 211, 212 are called "mask signals" or "permission signals".

The configurations of the four voltage comparators 221-224 and the two OR circuits 231, 232 are identical to two sets of the voltage comparators 594, 596, and the OR circuit 598 of the excitation interval setting unit 590 shown in FIG. 13A. Therefore, the output signal of the OR circuit 231 for the phase A coils is similar to the excitation interval signal Ea shown in FIG. 13B. Further, when the output signal of the phase A charge switching unit 202 is at a "1" level, the mask signal MSKA outputted from the AND circuit 211 for the phase A coils is identical to the output signal of the OR circuit 231. Those operations are identical to those relating to the phase B.

The rectifier circuit 250 has the circuitry for the phase A coils which includes a full-wave rectifier circuit 252 comprising a plurality of diodes, two gate transistors 261, 262, a buffer circuit 271, and an inverter circuit 272 (NOT circuit). The identical circuitry is also provided for the phase B. The gate transistors 261, 262 are connected to the power wiring 280 for regeneration. It is preferable to use Schottky diodes which have excellent characteristics of low Vf as the plurality of diodes.

During power regeneration, the AC power generated in the phase A coils 12A is rectified with the full-wave rectifier circuit 252. The mask signal MSKA for the phase A coils and the inverted signal thereof are supplied to the gates of the gate transistors 261, 262, and the gate transistors 261, 262 are ON/OFF controlled accordingly. Therefore, within a period in which at least one of the mask signals TPA, BTA outputted from the voltage comparators 221, 222 is at an H level, the regenerated power is outputted to the power source wiring 280. On the other hand, within an interval in which both mask signals TPA, BTA are at an L level, power regeneration is inhibited.

As clearly follows from the explanation provided hereinabove, the regenerated power can be recovered by using the regeneration controller 200 and rectifier circuit 250. Furthermore, the regeneration controller 200 and rectifier circuit 250 can restrict the interval in which the regenerated power from the phase A coils 12A and phase B coils 12B is recovered, according to the mask signal MSKA for the phase A coils and the mask signal MSKB for the phase B coils, thereby making it possible to adjust the quantity of the regenerated power.

As described above, in the brushless motor of the first embodiment, the axis unit 64 is fixed to the stator unit 10, and the rotor unit 30 rotates around the axis unit 64. The driven member such as the wheel part 71 is linked to the rotor unit 30, so it is possible to rotate the driven member without rotating the central axis of the motor.

C. MODIFICATION EXAMPLE OF MOTOR CONFIGURATION OF EMBODIMENT 1

Figure 18A:
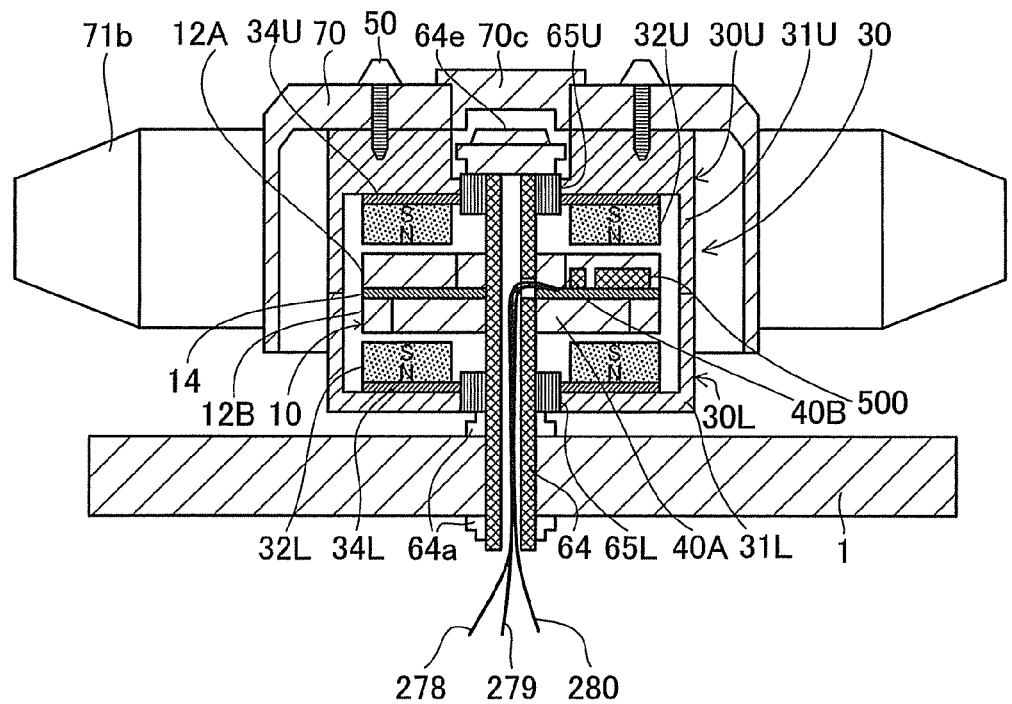
FIGS. 18A and 18B are explanatory drawings showing another example of the motor configuration of the first embodiment 1.
Figure 18B:
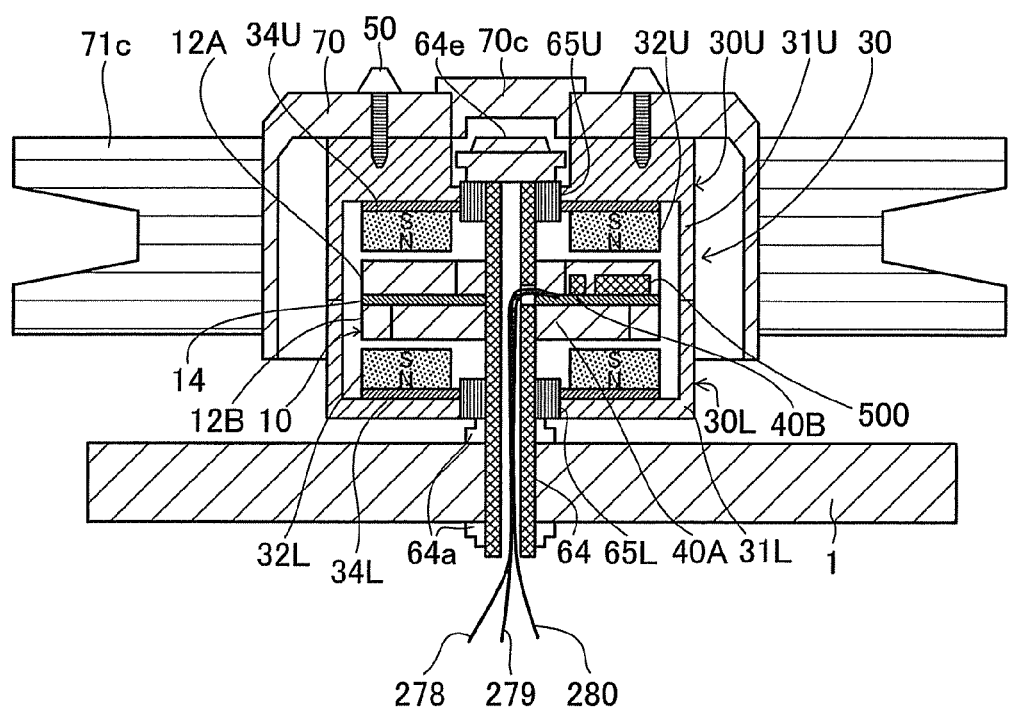

FIGS. 18A and 18B are explanatory drawings showing another example of the motor configuration of the first embodiment 1. In the embodiment 1 noted above, the wheel part 71 is attached to the outer periphery of the motor, but instead of that, it is also possible to attach a gear 71b and to use the motor main unit as part of the gear (FIG. 18A). Instead of the gear 71b, it is also possible to attach a pulley 71c (FIG. 18B).

D. MOTOR CONFIGURATION OF EMBODIMENT 2

Figure 19:
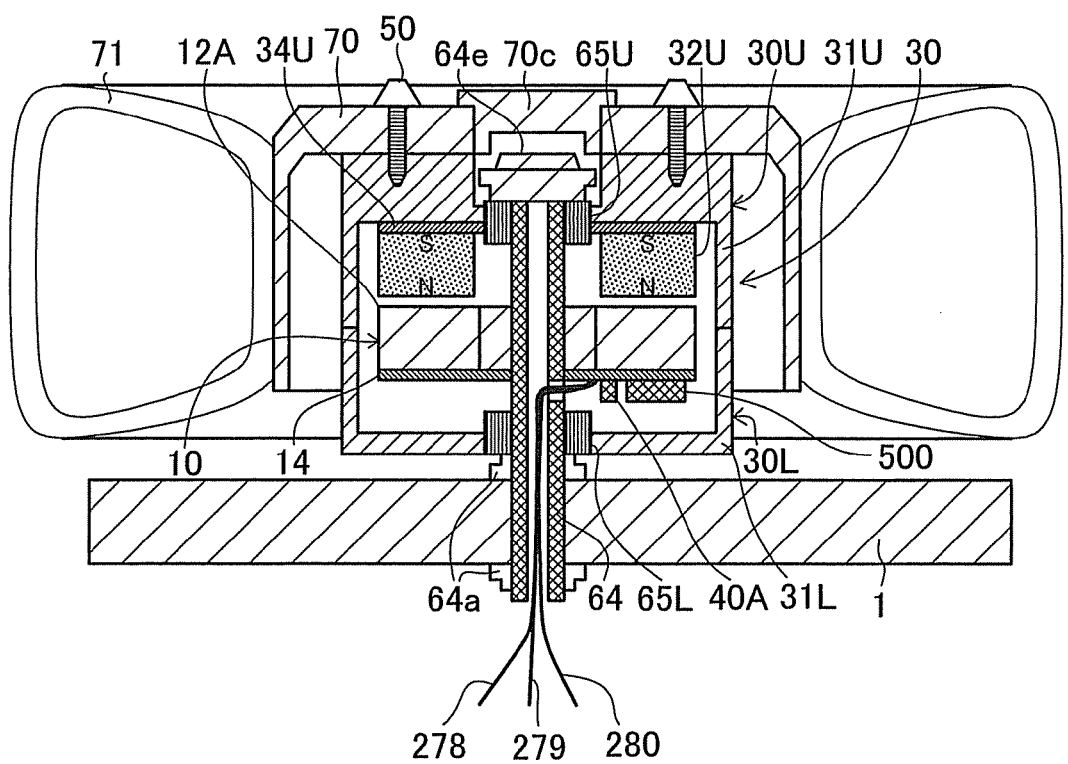
FIG. 19 is an explanatory drawing showing the motor configuration of the embodiment 2.

FIG. 19 is an explanatory drawing showing the motor configuration of the embodiment 2. The difference from the embodiment 1 shown in FIGS. 1A-1D is only that the permanent magnet 32 and the coil 12 are provided on only one side of the support member 14, and the remainder of the configuration is the same as the embodiment 1. In this way, as a one side excitation motor as well, it is possible to rotate the driven member without rotating the central axis of the motor.

E. MOTOR CONFIGURATION OF EMBODIMENT 3

Figure 20A:
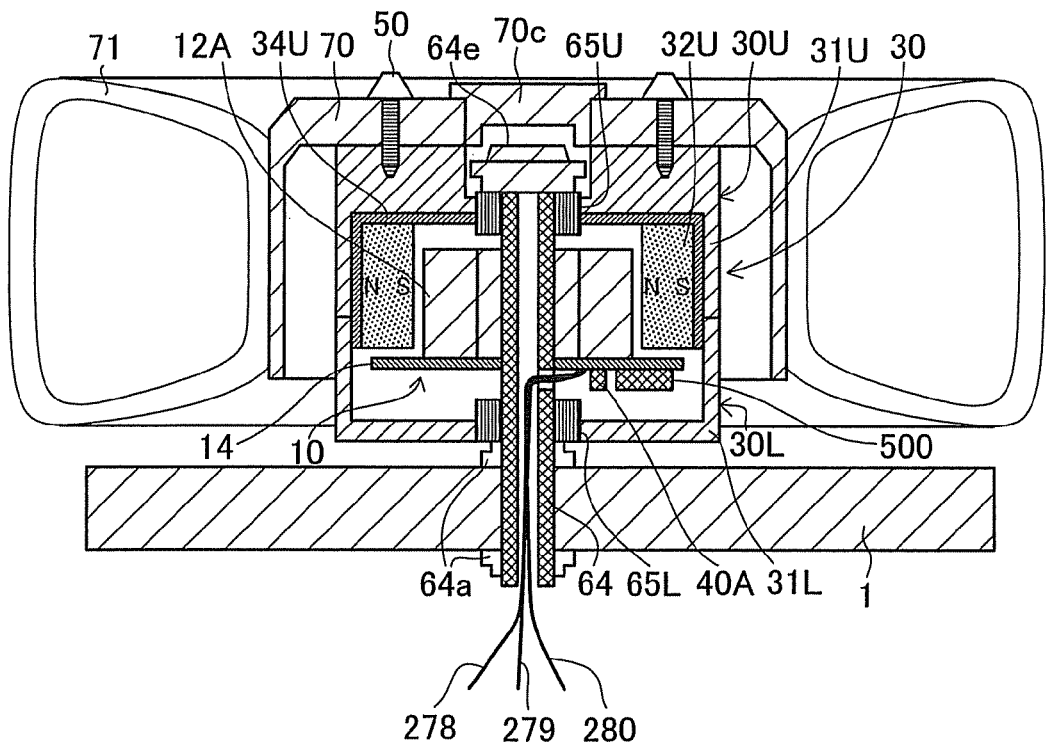
FIGS. 20A and 20B are explanatory drawings showing the configuration of the motor of the embodiment 3.
Figure 20B:
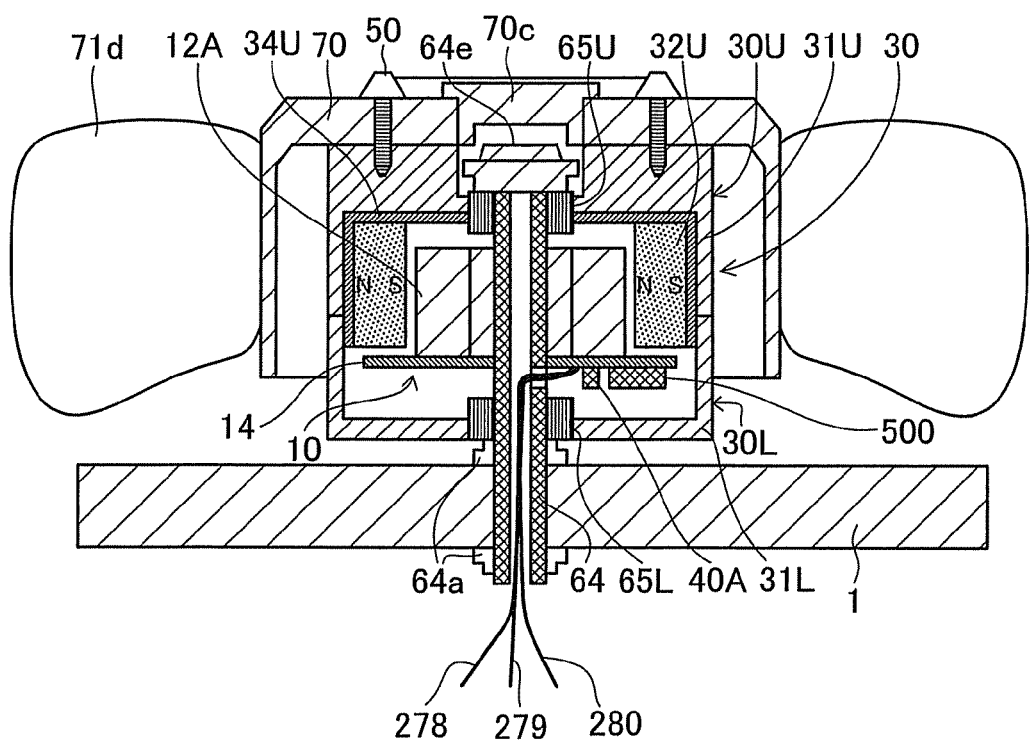

FIGS. 20A and 20B are explanatory drawings showing the configuration of the motor of the embodiment 3. The difference from the embodiment 1 shown in FIGS. 1A-1D is only that the permanent magnet 32 is arranged at the outer periphery side of the coil 12, and the remainder of the configuration is the same as the embodiment 1 (FIG. 20A). Instead of the wheel part 71, it is also possible to attach a blade 71d, and to use this motor as a fan motor (FIG. 20B). In this way, even if the arrangement of the permanent magnet 32 and the coil 12 is the same arrangement as that of an outer rotor type motor, it is possible to rotate the driven member without rotating the central axis of the motor.

F. MODIFICATION EXAMPLE

The present invention is not limited by the embodiments set forth hereinabove by way of illustration, and various other embodiments such as the following are possible within the scope and spirit thereof.

F1. Modification Example 1

While the preceding embodiments described a two-phase brushless motor and a three-phase brushless motor, it is possible to implement the present invention in a brushless motor having any number M of phases where M is an integer equal to 1 or greater. While it is sufficient for the coils of each phase to include at least one electromagnetic coil, it is preferable that coils for one phase include two or more electromagnetic coils.

F2. Modification Example 2

While analog magnetic sensors are employed in the preceding embodiments, it is possible to use digital magnetic sensors having multivalue analog-like output in place of analog magnetic sensors. Both an analog magnetic sensor and a digital magnetic sensor having multivalue analog-like output will have an output signal exhibiting analog variation. Herein, an "output signal exhibiting analog variation" refers in the broad sense to include both analog output signals, and multilevel digital output signals having three or more levels, excluding On/Off binary output.

It is also acceptable to use a digital magnetic sensor having binary digital output instead of a sensor having an output signal exhibiting analog variation. In this case, the AD converter 570 and the excitation interval setting unit 590 of FIG. 9A will not be necessary. Consequently, it will be possible to realize the drive control circuit by means of an inexpensive IC, at the cost of lower efficiency and possible occurrence of noise/vibration due to failure to set the excitation period or to use a sine wave drive waveform.

F3. Modification Example 3

It is possible to employ as the PWM circuit various circuit configurations besides that shown in FIG. 10. For example, it is possible to utilize a circuit that performs PWM control by comparing sensor output with a triangular reference wave. Moreover, the drive signal may be generated by some method besides PWM control. It is also possible to employ a circuit that generates drive signals by some method besides PWM control. For example, a circuit that amplifies sensor output to generate an analog drive signal may be used.

In FIG. 8A, the AD converter 570 may be replaced with a voltage comparator. In this case, the drive waveform will be rectangular rather than a sine wave drive waveform, and thus noise/vibration will occur; on the other hand, it will be possible to realize the drive control circuit by means of an inexpensive IC.

F4. Variant Example 4

The present invention is also applicable to motors that do not include regenerating circuits and to generators that do not include drive control circuits. For example, the present invention is applicable to the motors for various types of devices such as automated camera platforms for projectors, automated camera platforms for video cameras, electric vehicles, blimps, helicopters, jet engines (pressure portion), robots, fan motors, clocks (clock hand drive), drum type washing machines (single rotation), jet coasters, vibration motors, toys, and the like.

Figure 21:
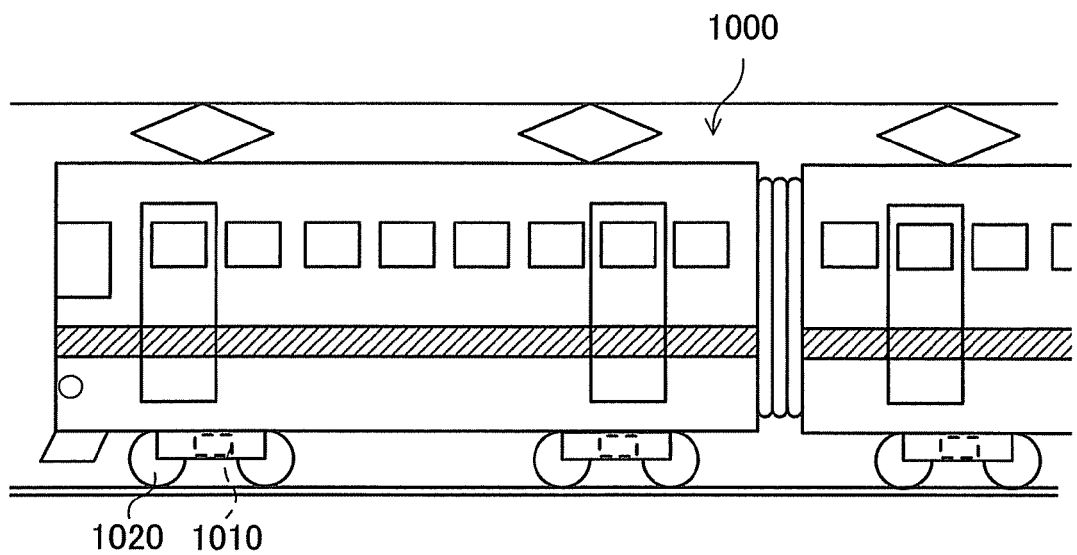
FIG. 21 is an explanatory drawing showing a railway vehicle using a motor according to the embodiment of this invention.

FIG. 21 is an explanatory drawing showing a railway vehicle using a motor according to the embodiment of this invention. This railway vehicle 1000 has a motor 1010 and a wheel 1020. This motor 1010 drives the wheel 1020. Furthermore, the motor 1010 is used as a generator when the railway vehicle 1000 is applied the brake, and regenerates power. As this motor 1010, it is possible to use the various types of brushless motor described above.

F5. Variant Example 5

In the embodiments noted above, a fixing screw unit 50 for attachment and detachment was provided, but it is also possible to eliminate the fixing screw unit 50 and form the wheel unit 70 and the rotor unit 30 as a single unit.

What is claimed is:

1. A brushless motor driving a driven member, comprising:
   a round-disk shaped stator having a plurality of phase-A coils and a plurality of phase-B coils;
   an axis fixed to the stator;
   a rotor rotating around the axis and linked to the driven member, the rotor having a first round-disk shaped rotor and a second rotor connected to the first rotor, the first rotor and the second rotor sandwiching the stator therebetween, the first rotor being positioned on one side of the stator and including first magnets, the second rotor being positioned on another side of the stator and including second magnets;
   a wiring coupled to the brushless motor, the wiring being provided through an inside of a part of the axis; and
   a magnetic yoke made of a ferromagnetic body, the magnetic yoke being disposed on outside faces of the first and second magnets;
   wherein the phase-A coils and the phase-B coils are positioned at locations phase-shifted by $\pi/2$ from each other;
   wherein the phase-A coils and the phase-B coils have no magnetic core;
   the number of the first magnets is equal to the number of the phase-A coils;
   the number of the second magnets is equal to the number of the phase-B coils;
   the first magnets are each positioned at a constant magnetic pole pitch, with adjacent magnets being magnetized in opposite directions;
   the second magnets are each positioned at a constant magnetic pole pitch, with adjacent magnets being magnetized in opposite directions;
   the first magnets and the second magnets are positioned with their magnetic poles which face towards the stator having mutually different polarity;
   the magnetic pole pitch of the first magnets and the second magnets is equal to a coil pitch of the phase-A coils and the phase-B coils;
   a magnetic field of the first and second magnets is directed perpendicularly through the stator; and
   AC drive signals are delivered to the phase-A coils and the phase-B coils.

2. The brushless motor according to claim 1, further comprising,
   a regenerating circuit that regenerates power from the phase-A coils and the phase-B coils.

3. The brushless motor according to claim 1, wherein the phase-A coils and the phase-B coils are coated with resin.

4. A device, comprising:
   the brushless motor according to claim 1; and
   the driven member that is driven by the brushless motor.

5. The device according to claim 4, wherein the device is a movable body.

6. The movable body according to claim 5, wherein the movable body is a railway vehicle.

7. The brushless motor according to claim 1, wherein the rotor enwraps the round-disk shaped stator, and the first magnets and the second magnets are provided at an inside of the rotor.

* * * * *